US 7,669,209 B2

(12) United States Patent
Inohara et al.

(10) Patent No.: US 7,669,209 B2
(45) Date of Patent: Feb. 23, 2010

(54) METHOD FOR OPTIMIZING REMOTE PROCEDURE CALL (RPC) AND PROGRAM EXECUTION METHOD BY USE OF THE OPTIMIZED RPC

(75) Inventors: Shigekazu Inohara, Kokubunji (JP); Shinji Fujiwara, Sagamihara (JP); Yoshimasa Masuoka, Yokohama (JP); Nobutoshi Sagawa, Koganei (JP)

(73) Assignee: Hitachi, Ltd., Tokyo (JP)

( * ) Notice: Subject to any disclaimer, the term of this patent is extended or adjusted under 35 U.S.C. 154(b) by 904 days.

(21) Appl. No.: 11/066,269

(22) Filed: Feb. 28, 2005

(65) Prior Publication Data

US 2005/0273792 A1 Dec. 8, 2005

Related U.S. Application Data

(63) Continuation of application No. 09/405,089, filed on Sep. 27, 1999, now abandoned.

(30) Foreign Application Priority Data

Sep. 25, 1998 (JP) .................................. 10-270890

(51) Int. Cl.
*G06F 3/00* (2006.01)
(52) U.S. Cl. ..................................................... 719/330
(58) Field of Classification Search ................. 719/328, 719/330
See application file for complete search history.

(56) References Cited

U.S. PATENT DOCUMENTS

| 5,307,490 A | 4/1994 | Davidson et al. ............ 709/328 |
| 5,430,876 A | 7/1995 | Schreiber et al. ............ 709/328 |
| 5,617,570 A * | 4/1997 | Russell et al. ............... 719/312 |

(Continued)

OTHER PUBLICATIONS

RPC: Remote Procedure Call Protocol Specification: Version 2, Sun Microsystems Inc., Network Working Group RFC-1057, Jan. 1988, pp. 1-11.

(Continued)

*Primary Examiner*—Lechi Truong
(74) *Attorney, Agent, or Firm*—Brundidge & Stanger, P.C.

(57) ABSTRACT

A method for rapidly executing a series of remote procedure calls between a client and a server, comprising an RPC optimizer (101) that inputs an IDL source code (103) and client source codes (102, 102', . . . ) so as to define as a new remote procedure a group of remote procedures to be performed by the client in an additional server source code (107). In turn, the RPC optimizer outputs a new IDL source code (106) to which an interface of the remote procedure is added, and new client source codes (105, 105', . . . ) modified so as to use the remote procedure. This reduces communications involving a plurality of remote procedures to a single communication pass, thereby implementing high-speed communication between the client and the server.

2 Claims, 18 Drawing Sheets

U.S. PATENT DOCUMENTS

| | | | |
|---|---|---|---|
| 5,675,805 A | 10/1997 | Boldo et al. | 717/114 |
| 5,682,534 A | 10/1997 | Kapoor et al. | 709/328 |
| 5,724,588 A | 3/1998 | Hill et al. | 709/328 |
| 5,778,228 A | 7/1998 | Wei | 709/328 |
| 5,794,047 A | 8/1998 | Meier | 717/133 |
| 5,887,172 A | 3/1999 | Vasudevan et al. | 709/328 |
| 5,926,636 A | 7/1999 | Lam et al. | 709/313 |
| 5,970,248 A | 10/1999 | Meier | 717/125 |
| 6,067,580 A | 5/2000 | Aman et al. | 709/330 |
| 6,202,089 B1 | 3/2001 | Juster | 709/219 |
| 6,282,652 B1 * | 8/2001 | Scheifler | 726/14 |
| 6,792,611 B2 * | 9/2004 | Honishi et al. | 719/328 |

OTHER PUBLICATIONS

T. J. Mowbray, et al, Inside CORBRA, Addison-Wesley, 1997, pp. 8-17.

A. Aho, Principles of Compiler Design, Addision-Wesley Publishing Company, Dec. 1981.

Gidron et al "An RPC-Based Methodology for Client/Server Application Development in C++" pp. 39-46, 1997 IEEE.

* cited by examiner

FIG. 6

INSTRUCTION TABLE 600

| INSTRUCTION ID 602 | TARGET 603 | INSTRUCTION 604 | OPERAND A 605 | OPERAND B 606 |
|---|---|---|---|---|

INSTRUCTION ELEMENTS 601 :

BASIC BLOCK TABLE 610

| BASIC BLOCK ID 612 | START INSTRUCTION ID 613 | END INSTRUCTION ID 614 |
|---|---|---|
| NEXT BASIC BLOCK 615 | PRECEDING BASIC BLOCK 616 | ENVIRONMENT ID 617 |
| DGEN VARIABLE TABLE 618 | DKILL VARIABLE TABLE 619 | DIN VARIABLE TABLE 620 / DOUT VARIABLE TABLE 621 |
| LIN VARIABLE TABLE 622 | LOUT VARIABLE TABLE 623 | LUSE VARIABLE TABLE 624 / LDEF VARIABLE TABLE 625 |

BASIC BLOCK ELEMENT 611 :

COMPOSITE BLOCK TABLE 630

| COMPOSITE BLOCK ID 632 | START BASIC BLOCK ID 633 | END BASIC BLOCK ID 634 | ENVIRONMENT ID 635 |
|---|---|---|---|

COMPOSITE BLOCK ELEMENT 631 :

ENVIRONMENT TABLE 640

| ENVIRONMENT ID 641 | PARENT ENVIRONMENT ID 642 | ATTRIBUTE 643 |
|---|---|---|

INTRA-ENVIRONMENT VARIABLE TABLE 644

RPC TABLE 650

| RPC NAME 652 | IN ARGUMENT TABLE 653 | OUT ARGUMENT TABLE 654 | ATTRIBUTE 655 |
|---|---|---|---|

RPC TABLE ELEMENT 651 :

| TYPE NAME 656 | TYPE INFORMATION 657 |
|---|---|

TYPE DECLARATION ELEMENT 658 :

VARIABLE TABLE 660

| VARIABLE NAME 662 | TYPE 663 | ATTRIBUTE 664 |
|---|---|---|

VARIABLE TABLE ELEMENT 661 :

FIG. 7

```
intf.idl
701  interface MyServer {
702      int func1(in int i);
703      void func2(inout long key, in String value);
704  };
```
⸺700

```
client1.c
751  #include "intf.h"
752  main()
753  {
754      MyServer server = lookupDirectory("MyServer");
755      int count = 0;
756      for (int i = 0; i < 100; i++)
757          count += server.func1(i);
758      }
759      printf("count=%d¥n", count);
760      server.func2(100, "hello world");
761      server.func1(j);
762  }
```
⸺750

FIG. 8

```
        intf.h
801  #include "Object.h"

802  class MyServer; public Object {
803      int func1(int i);
804      void func2(long& key, char* value);
805  }
```
⎫ 800

```
        clientstub.c
851  #include "intf.h"

852  int MyServer::func1(int i)
853  {
854      Buffer buf = new Buffer();
855      int rval;
856      buf.packint(i);
857      call("func1", buf);
858      buf.unpackint(&rval);
859      delete buf;
860      return rval;
861  }

862  void MyServer::func2(long& key, char* value)
863  {
864      Buffer buf = new Buffer();
665      buf.packlong(key);
866      buf.packString(value);
867      call("func2", buf);
868      buf.unpacklong(&key);
869      delete buf;
870  }
```
⎫ 850

FIG. 9

```
    serverstub.c
901 #include "intf.h"

902 void MyServer::loop()
903 {
904     while (1) {
905         Buffer buf;
906         Client client;
907         receive(&client, &buf);
908         if (buf.method.equals("func1")) {
909             int i, rval;
910             buf.unpackint(&i);
911             rval = func1(i);
912             buf.packint(rval);
913         } else if (buf.method:equals("func2") {
914             long key;
915             char* value;
916             buf.unpacklong(&key);
917             buf.unpackString(&value);
918             func2(key, value);
919             buf.packlong(key);
920         } else {
921             send(client, "error");
922             continue;
923         }
924         send(client, buf);
925         delete buf;
926         delete client;
927     }
928 }
```

FIG. 10

```
intf'.idl 1001  interface MyServer {
1002      int func1(in int i);
1003      void func2(inout long key, in String value);
1004      void func3(inout int count);
1005      void func4(in int i);
1006  };
```
⟵ 1000

```
client1'.c

1011  #include "intf'.h"

1012  main()
1013  {
1014      MyServer server = lookupDirectory("MyServer");
1015      int count = 0;
1016      server.func3(count);
1017      printf("count=%d¥n", count);
1018      server.func4(j);
1019  }
```
⟵ 1010

```
server+.c

1031  #include "intf'.h"

1032  void MyServer::func3(int& count)
1033  {
1034      for (int i = 0; i < 100; i++)
1035          count += server.func1(i);
1036  }

1037  void MyServer::func4(lint count)
1038  {
1039      server.func2(100,"hello world");
1040      server.func1(count);
1041  }
```
⟵ 1030

FIG. 18

```
        extended_intf.idl
1801  interface MyServer {
1802      int func1(in int i) const;
1803      void func2(inout long key, in String value);
1804      int func3(void);

1805      commutative { func2, func3 };

1806      parallel { func1, func2, func3 };
1807  };
```
1800

```
        server+.c
1821  #include "intf'.h"
1822  #include "thread.h"

1823  void MyServer::func3(int& count)
1824  {
1825      List<Thread> allThreads;
1826      Thread t;
1827      void *rval;
1828      for (int i = 0; i < 100; i++) }
1829          create_thread(&t, server.func1, 1, i),;
1830          allThreads.add(t);
1831      }
1832      for ( ; (t = allThreads.next ()) != NULL_THREAD; ) {
1833          join_thread(t, &rval);
1834          count += *(int *)rval;
1835      }
1836  }

1837  void MyServer::func4(int count)
1838  {
1839      List<Thread> allThreads;
1840      Thread t;
1841          create_thread(&t, server.func2, 2, 100, "hello world");
1842          allThreads.add(t);
1843          create_thread(&t, server.func1, 1, count);
1844          allThreads.add(t);
1845          for ( ; (t = allThreads.next()) != NULL_THREAD; )
1846              join_thread(t, NULL);
1847  }
```
1820

METHOD FOR OPTIMIZING REMOTE PROCEDURE CALL (RPC) AND PROGRAM EXECUTION METHOD BY USE OF THE OPTIMIZED RPC

The present application is a continuation of application Ser. No. 09/405,089, filed Sep. 27, 1999, now abandoned, the contents of which are incorporated herein by reference.

BACKGROUND OF THE INVENTION

The present invention relates to a computer system and, more particularly, to a method for optimizing a remote procedure call made between a plurality of computers or processors connected by a network, as well as to a program execution method by use of the optimized remote procedure call.

DESCRIPTION OF THE PRIOR ART

Distributed computing systems each comprising at least two computers connected by a computer network are used extensively today. There exist a number of models for communication between at least two programs or program parts (referred to as objects hereunder) executed on the networked computers, or between at least two objects run on a single computer. Typical models include a datagram communication model (for transmitting and receiving communication data in units called packets), a stream communication model (for transmitting and receiving a stream of continuous communication data in units of a desired length), a distributed shared memory model (for performing updates of and references to specific memory addresses in conjunction with the transmission and reception of communication data), and a remote procedure call model (for associating procedure calls with communications). The procedures are also referred to as functions or subroutines. In the description that follows, procedures, functions and subroutines will all have the same meaning wherever they are used.

Of the above models, the RPC model is used by a variety of distributed computing systems because it ensures a high affinity with procedure-oriented language and allows programmers virtually to become unaware of communication at the programming stage. Commercialized RPCs include: Sun RPC, described in Chapter 3, "RPC: Remote Procedure Call Protocol specification: Version 2" (by Sun Microsystems Inc.; Network Working Group RFC-1057, January 1988; referred to as the Cited Reference 1 hereunder); and CORBA, discussed in Paragraph 1.5, "Inside CORBA" (by T. J. Mowbray and W. A. Ruh; Addison-Wesley, 1997; referred to as the Cited Reference 2 hereunder).

An RPC is typically implemented by having a first procedure called in a first object (referred to as the client object or simply the client hereunder), followed by a second procedure called from within a second object (referred to as the server object or simply the server hereunder). The second procedure provided by the server to a client is referred to as the remote procedure in this specification. It is common practice to give the same name to the first and the second procedure (the name is referred to as the first procedure name) so as not to let programmers become aware of communication during programming. A group of arguments given to the first procedure is communicated to the second object wherein the argument group is given to the second procedure. Returned values following the execution of the second procedure are communicated to the first object wherein the values are regarded as returned values of the first procedure. This scheme is typically implemented as follows: using an interface definition language (IDL), programmers describe a first procedure name as the name of a remote procedure and types of the remote procedure (i.e., argument group type and returned value type) in what is known as an IDL description. Programmers of the server prepare the IDL description that includes the name and types of the remote procedure. An IDL compiler inputs the IDL description thus prepared and translates it into a programming language (referred to as the source program language hereunder) for use in programming source programs (source codes) of the first and the second object. In many cases, the translation yields three outputs. The first output is an RPC header file that describes the name and types of the first procedure in the IDL description using a source programming language. The RPC header file contains a type declaration that is utilized in building the first and the second object. The RPC header file may not be needed depending on the type of source programming language.

The second output is a source code referred to as a client stub. The client stub includes definitions of the first procedure (i.e., code sequence). As such, the first stub is used to constitute part of the first object. The third output is a source code referred to as a server stub. The server stub includes definitions of a procedure that calls the second procedure upon receipt of a communication from the client stub. The server stub is used to constitute part of the second object.

The first object is built by compiling the source codes and client stub for implementing functions specific to the first object, and by linking a library for assisting stubs referred as an RPC run time library. The second object is built by compiling the source codes and server stub for implementing functions specific to the second object, and by linking the RPC run time library. At run time, the client stub and the server stub communicate with each other in steps to be described below so as to associate the start of the first procedure with the start of the second procedure. In many cases, communications between the client stub and the server stub are carried out using a network communication function or an inter-process communication function offered by the operating system and hardware.

The first procedure of the client stub has the following contents: "convert the first procedure name and all arguments from representations in memory into communication data and transmit the communication data to the server stub; wait for a completion notice from the server stub; terminate the first procedure upon receipt of a completion notice; and if returned values are received from the server stub, regard the returned values as those of the first procedure." In many cases, upon start of the first object, arguments are illustratively used to determine on which computer the server stub is to run and how communications are to be performed (selection of communication protocol, communication port, etc.), the arguments being passed on implicitly to the first procedure. Meanwhile, the procedure of the server stub has the following contents: "when a first procedure name and a group of arguments are received from a communicating party, convert the argument group from communication data into representations in memory; call up as arguments the argument group in effect after the second procedure corresponding to the first procedure name has been converted; upon completion of the second procedure, notify the communicating party of the completion; if the second procedure has returned values at that point, convert the returned values from representations in memory into communication data and transmit the communication data to the communicating party." In the above case, the communicating party is the client stub of the first object. Because there are many cases where a plurality of first objects exist in connection with one second object, the procedures of the server tub often operate while differentiating a plurality of communicating parties.

Generally, one IDL description has a plurality of remote procedures described therein. In that case, the client stub also includes a plurality of procedures. The server stub includes definitions of a procedure which differentiates the multiple procedures, which associates each of calls of the multiple procedures with any one of a plurality of procedures in the second object, and which calls up the procedure in question from the second object.

What follows is a description of how RPCs are generally used. RPCs are often utilized in distributed processing of a client-server architecture. Specifically, each of the functions offered by the server to clients is defined as a remote procedure. Where necessary, a client calls remote procedures to make use of the associated server functions. The RPC has a good affinity with object-oriented programming (object-oriented RPC). Where object methods (i.e., interfaces through which to operate objects) are each associated with a remote procedure, it is possible to call remote procedures between objects in any of such cases as in a single process, between a plurality of processes, and between a plurality of computers (a process is an execution unit offered by the operating system). A typical object-oriented RPC is CORBA described in the Cited Reference 2 above.

Whether the RPC is a client-server type RPC or an object-oriented RPC, the procedures that programmers prepare as remote procedures tend to be those offering single functions, mainly for design reasons. In other words, remote procedures each provide an independent function and are designed to exert their capabilities when combined as a group. Such a design technique accommodates clients' processing requirements modified after the design stage, making it easy to carry out processing modifications or functional expansions without affecting the client-server interface.

The above tendency applies to the object-oriented RPC as well. As its methods, the object-oriented RPC tends to have a set of interfaces functionally sufficient to operate objects. Programs on the side of using a given object combine these methods to operate the object in question. The above design technique allows flexibly for processing modifications and functional expansions on the object-using side. That is, the RPC generally resorts to programs wherein a large number of remote procedures are combined for desired processing.

PROBLEMS TO BE SOLVED BY THE INVENTION

When a program is prepared by combining numerous remote procedures to be processed, it takes a large amount of time to process the remote procedures so that, in some cases, the target performance of the program in question may not be obtained. The biggest reason for this eventuality is that each of the remote procedures involves executing communications between processes within a single computer or between a plurality of computers. The period of time required to call a remote procedure is dozens of times the period in which to make an ordinary procedure call within a single computer, and is as long as 10,000 times the period for the same call between a plurality of computers. (For example, if it is assumed that it takes 10 cycles to call a procedure on a 100 MHz computer, it takes 100 nanoseconds to make a single remote procedure call. The latency per communication amounts to at least one millisecond or thereabout in a typical combination of a local area network with the TCP/IP protocol.) If programs are prepared wherein RPCs are used as often as ordinary procedure calls, the processing time involved can be as long as 10,000 times the ordinary time period.

The speeds of components operating in computers are expected to become higher than ever from now on. In such cases, the difference in execution time between an ordinary procedure call and an RPC will presumably expand further. The reason for the discrepancy is that the increase in processor speed is mainly attributable to improvements in the velocity of instruction execution (i.e. number of instructions executed per second) while the rise in network speed depends primarily on the increase of communication throughput (number of bytes communicated per second). Because communications triggered by remote procedures involve arguments and returned values as described above, individual communication data items (i.e., packets) are relatively short (mostly several bytes to several kilobytes per packet).

In addition, communications take place only intermittently because of the need of each remote procedure for synchronization. As long as packets are forwarded on an intermittent basis, high communication throughput cannot be obtained.

What is needed here is optimization. Specifically, if clients' source codes described by programmers contain numerous RPCs, these RPCs should be integrated into smaller units for execution in order to reduce the number of actually performed communications. This should reduce the latency of communication and enhance communication throughput. The challenge is how to perform the optimization automatically by computer programs and not manually by computer programmers. Meeting that challenge should permit efficient program design and development in line with the general usage of the RPC while enhancing performance at run time.

In more concrete terms, problems (A) through (G) below are to be resolved:

(A) Unlike in cases where stream communications or datagram communications are to be integrated, efforts to integrate a series of remote procedures require knowing how clients are specifically using these procedures. That is because remote procedures intrinsically require synchronization and generally have returned values.

Because remote procedures involve synchronization, an attempt simply to delay any remote procedure requested by a client will halt processing on the client side. Returned values of a remote procedure cannot be acquired unless and until the procedure in question is executed. Since the returned values could be used in a process subsequent to the remote procedure, simply delaying the remote procedure will disrupt the client's processing.

(B) Generally, a server provides a plurality of remote procedures and clients execute as needed any of these remote procedures. In such a case, the attempt to integrate a plurality of RPCs into a single RPC requires an expansion of the server; a new remote procedure needs to be added to the server side to process the single RPC.

In the case above, attempts simply to add all procedure combinations as new remote procedures to the server are untenable because the number of combinations is too large to handle. It is necessary to analyze the client's source code in order to determine which remote procedures are to be combined in what sequence into each new remote procedure.

(C) Where the server offers a plurality of remote procedures, any of which may be executed as needed by clients, the effort to integrate a plurality of RPCs into a single RPC requires supplementing the IDL description of the server with a name and a type of a new remote procedure for processing the single RPC following the integration.

In the case above, it is generally expected that returned values of a given RPC are combined with local variables of the client in starting the next RPC. This requires analyzing the client's source code in order to determine the name and type of the new remote procedure, thereby deciding which local variables of the client will be used within the new remote procedure.

(D) To analyze the client's source code to distinguish RPCs from ordinary procedures requires matching the IDL description against the client's source code. Because the manner of offering the IDL description differs from system to system, it is necessary to deal with different manners of IDL description provision. This applies illustratively to such remote procedure call systems as Sun RPC and DCE RPC wherein the IDL description is provided separately from the server's source code.

(E) In a CORBA setup, for example, a query to the server reveals the names and types of the remote procedures offered by the server. This is another case to be dealt with, wherein the IDL description is embedded (conceptually) in a server object.

(F) In another example, the names and types of remote procedures may be described in the server's source code in Java (registered trademark of Sun Microsystems Inc.). This is yet another case to be dealt with, wherein the IDL description is embedded (conceptually) in the server's source code.

(G) Where a plurality of remote procedures are to be integrated, knowing the characteristics of the procedures (e.g., possibility of side effects following the integration, feasibility of executing procedures in parallel, interchangeability of procedures in execution sequence, etc.) helps expand the scope of alternative integrating methods and eventually leads to a boost in the efficiency of the integration. Thus if there is detected an execution sequence in which the client consecutively issues a plurality of remote procedures, there should be a way to represent the characteristics of the remote procedures in the IDL description in order to help create a new remote procedure for carrying out the execution sequence.

SUMMARY OF THE INVENTION

It is therefore an object of the present invention to overcome the problems (A) through (G) above and to provide, in view of the general usage of RPCs and the foreseeable trends of technological process in the field, a method for enhancing the performance of program execution in which a large number of remote procedures are called, whereby program compilation and execution are facilitated.

It takes longer to call RPCs than ordinary procedures because each of the remote procedures involves communication. A suitable group of remote procedure calls are integrated into a unit for communication, the calls being carried out collectively by the server. This reduces the latency of communication per remote procedure. Because packets in which to place arguments and returned values are increased in size as a result of the integration, the throughput of communicating arguments and returned values is made higher than before.

In particular, the invention envisages furnishing the means (a) through (g) below to solve the problems (A) through (G) outlined above.

(a) RPCs are optimized not by modifying either a server or a client alone but by altering both the server and the client, whereby a plurality of RPCs are integrated into the smallest possible number of RPCs (e.g., one RPC).

(b) A client's source code is analyzed in order to detect an execution sequence in which the client consecutively issues a plurality of remote procedures. Then a new remote procedure for carrying out the execution sequence is added to the server.

(c) After the client's source code is analyzed to detect an execution sequence in which the client consecutively issues a plurality of remote procedures, the arguments and returned values corresponding to the interface of a new remote procedure for carrying out the execution sequence in a single RPC are determined. The arguments and returned values for the new remote procedure are added to the IDL description.

(d) Primarily for the IDL description to be provided separately from the server's source code, the client's source code and IDL description are first input. In turn, the client's modified source code, an altered IDL description, and the server's source code to be added are output.

(e) Primarily where the IDL description is embedded (conceptually) in the server's object, the client's source code and the server's object are first input. In turn, the client's modified source code and the source code to be added to the server are output.

(f) Primarily where the IDL description is embedded (conceptually) in the server's source code, the optimization should be achieved without creating new chores for programmers. For that purpose, the client's source code and the server's object are first input. In turn, the client's modified source code and the source code to be added to the server are output.

(g) Upon detection of an execution sequence in which the client consecutively issues a plurality of remote procedures, the inventive method of representing characteristics of the remote procedures in the IDL description helps prepare a new remote procedure for performing that execution sequence.

More specifically, the invention envisages utilizing an RPC optimizer that inputs a client's source code along with an IDL description for RPC optimization. The RPC optimizer is a compiler which, given the IDL description and the client's source code as its input, outputs a modified IDL description, the client's altered source code, and the server's source code to be added.

In analyzing the client's source code, the RPC optimizer extracts from a series of remote procedure calls an RPC sequence which can be integrated and which is expected to provide better performance when integrated. That RPC sequence is regarded as a new remote procedure, and its interface is added to the IDL description.

The RPC sequence of the client's source code is changed into a code that employs the new remote procedure. As the server's additional source code, there is generated a body of the new remote procedure (constituted by the existing RPC sequence and by processes extracted from the client's source code).

Because remote procedures and ordinary procedures are generally utilized without distinction, it is comparatively rare to see only remote procedures arranged continuously (or called up repeatedly in a loop) in the client's source code. In fact, remote procedures are expected to appear more often in a more or less mixed relation with ordinary procedures such as references to and changes of variables within the client, branches based on returned values, and procedure calls inside the client. To deal with such cases, the RPC optimizer extracts an RPC sequence that may be integrated by analyzing the flow of data in the client's source code (data dependency analysis). Two kinds of analysis are adopted: data flow analysis used conventionally by compilers, and data dependency analysis carried out with emphasis on data types. If the data dependency analysis shows it is difficult to separate the remote procedures from the intra-client processing, the RPC optimizer achieves the integration using a portion of the intra-client processing in order to create a new remote procedure.

For some remote procedures, arguments and returned values are determined at run time. To know the effects of integrating these remote procedures and to decide whether or not to perform the integration requires obtaining relevant runtime information. For that purpose, the invention envisages recording statistics of starting arguments and returned values about each of the remote procedures being executed. The recordings are taken by use of the RPC run time library or by stubs. Statistics may also be recorded at a lower operative layer such as that of the operating system (OS). The data thus recorded are used by the RPC optimizer at the time of the next compilation.

The means and steps outlined above are used to integrate RPCs into a smaller unit so as to improve performance when a large number of remote procedures are called, whereby programs using remote procedures are made easier to prepare than before.

BRIEF DESCRIPTION OF THE DRAWINGS

FIG. 6 is a schematic view outlining a data structure of the RPC optimizer;

FIG. 7 is a schematic view of an IDL source code and a client source code;

FIG. 8 is a schematic view of an RPC header file and a client stub;

FIG. 9 is a schematic view of a server stub;

FIG. 10 is a schematic view of a new IDL source code, a new client source code, and an additional server source code;

FIG. 18 is a schematic view of an extended IDL syntax;

DETAILED DESCRIPTION OF THE PREFERRED EMBODIMENTS

Figure 1:
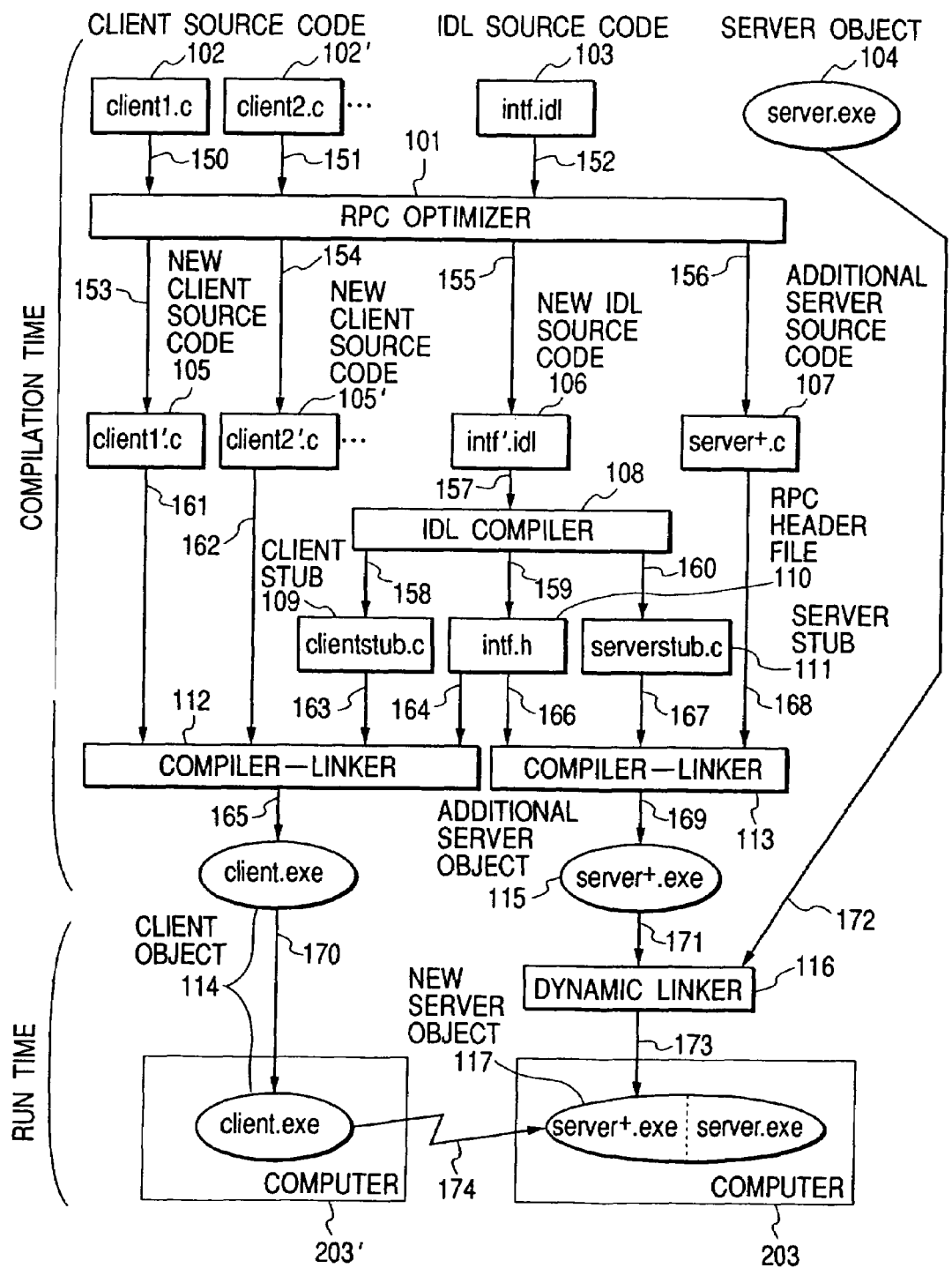
FIG. 1 is a block diagram outlining a typical configuration of one preferred embodiment of the invention.

Preferred embodiments of this invention will now be described with reference to the accompanying drawings.

Overall Constitution

An overall constitution of one preferred embodiment of the invention is described below by referring to FIGS. 1 and 2. An overall constitution 201 of the embodiment in FIG. 2 represents a distributed computer system comprising a network 202 and a plurality of computers 203, 203', 203", etc., interconnected by the network 202.

The network 202 may be a commonly-used LAN covering part or all of an organization (corporation, university or like institution), or may be part or all of a LAN connecting a plurality of geographically distributed points. The network 202 may alternatively be one which connects a plurality of computers or a plurality of processor elements within a parallel computer setup.

The computers 203, 203', 203", etc., may be so-called personal computers, workstations, parallel computers or mainframes. The computers 203, 203', 203", etc., which operate clients 204, 204', 204", etc., may be of any type as long as the computers are capable of communicating with servers 205, 205', etc. That is, the computers may be any of various computer terminals, personal digital assistants (PDA), handheld personal computers (HPC), network computers and others.

The servers 205, 205', etc., and clients 204, 204', 204", etc., are all programs or program parts (objects) executed by the computers 204, 204', 204", etc. The servers 205, 205', etc., are objects whose remote procedures are to be called up, while the clients 204, 204', 204", etc., are objects that call the remote procedures. The distinction between a server and a client in one relationship is determined by a given remote procedure. In other relationships, a server may become a client of another server, or two objects may be a server and a client to each other (i.e., with one remote procedure, a first object may act as a server and a second object as a client; with another remote procedure, the second object may act as a server and the first object as a client).

The computers 203, 203', 203", etc., may each operate at least either one client or one server, or at least one client and one server. In the overall configuration 201 of this embodiment, there exist at least one server and at least one client. The numbers and configurations of the computers 203, 203', 203", etc., clients 204, 204', 204", etc., and servers 205, 205', etc., are shown in FIG. 2 only for illustration purposes and are not limitative of the invention. The implementation of the invention is not dependent on the operating system of the client or server; on the type of the network between servers or between the server and the client; on the physical layer protocol or transport layer protocol of the network; or on whether the server and client are run on a single computer or on a plurality of computers. In another configuration embodying the invention, a single computer not connected to any network may exist. On that computer, the server may operate in one process and the client in a different process. In such a case, the invention may be practiced as a method for optimizing communications between the two processes.

Figure 2:
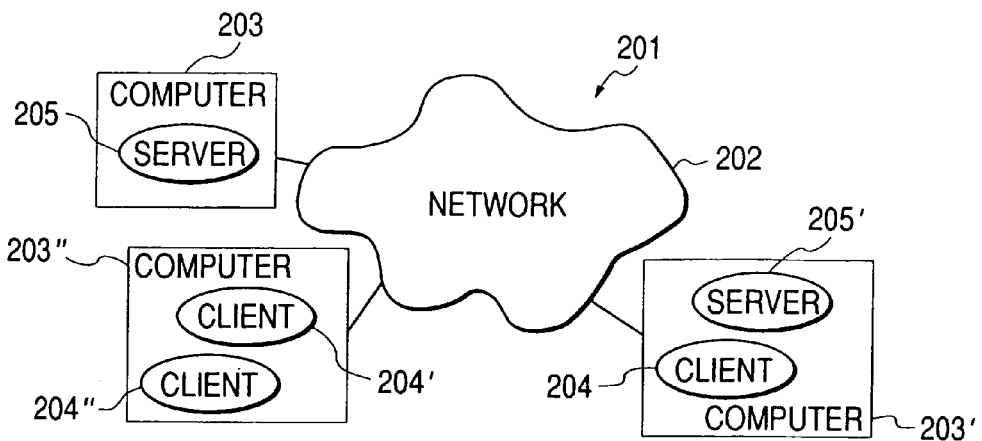
FIG. 2 is an overall schematic view of a distributed computer system to which the invention is applied.

FIG. 1 shows flows of uses made of the embodiment from the compilation stage of the clients up to the run stage of the clients and the server. Although FIG. 1 illustrates known programs such as compiler-linkers and an IDL compiler used in combination, that is only for illustration and is not limitative of the invention. For example, a readily conceivable modification of the invention may be a single execution program having functions of both an IDL compiler and the RPC optimizer of this embodiment. Another modification of the invention may be an execution program having functions of both a compiler and the RPC optimizer of this embodiment.

Besides being offered in an IDL description file, the IDL description may be arranged to be provided in a server object, obtained by communication with a server object, or acquired by communication with a server (interface repository) that has the IDL description in question. For purpose of simplification and illustration, it is assumed for this embodiment that the IDL description is offered in an IDL source code 103 that is an IDL description file. The IDL description may also be provided alternatively in any one of the above arrangements.

As its inputs (150-152), an RPC optimizer 101 accepts client source codes 102, 102', etc., constituting clients, and an IDL source code 103 that describes in IDL an interface of a group of remote procedures provided by the server. After optimizing RPCs, the RPC optimizer 101 outputs new client source codes 105, 105', etc., a new IDL source code 106, and an additional server source code 107 (153, 154, 155, 156).

As its input, an IDL compiler 108 accepts the new IDL source code 106 (157) and outputs a client stub 109, an RPC header file 110, and a server stub 111 (158, 159, 160) whose concepts outlined in the Description of the Prior Art above.

A compiler-linker 112 compiles and links (161, 162, 163, 164) the new client source codes 105, 105', etc., client stub 109, and RPC header file 110 into a client object 114, i.e., the client's executable program that is output (165). A compiler-linker 113 compiles and links (168, 167, 166) the additional server source code 107, server stub 111, and RPC header file 110 into an additional server object 115 that is output (169). This is what takes place at compilation time.

In the compilation example of FIG. 1, the client object 114 is executed (170) by the computer 203'. Meanwhile, the additional server object 115 and a server object 104 are dynamically linked together (171, 172) by a dynamic linker 116 before being executed (173) by the computer 203. The RPC (174) that takes place at run time is at least either a remote procedure previously declared in the IDL source code 103 or a remote procedure declared in the new IDL source code 106.

Figure 3:
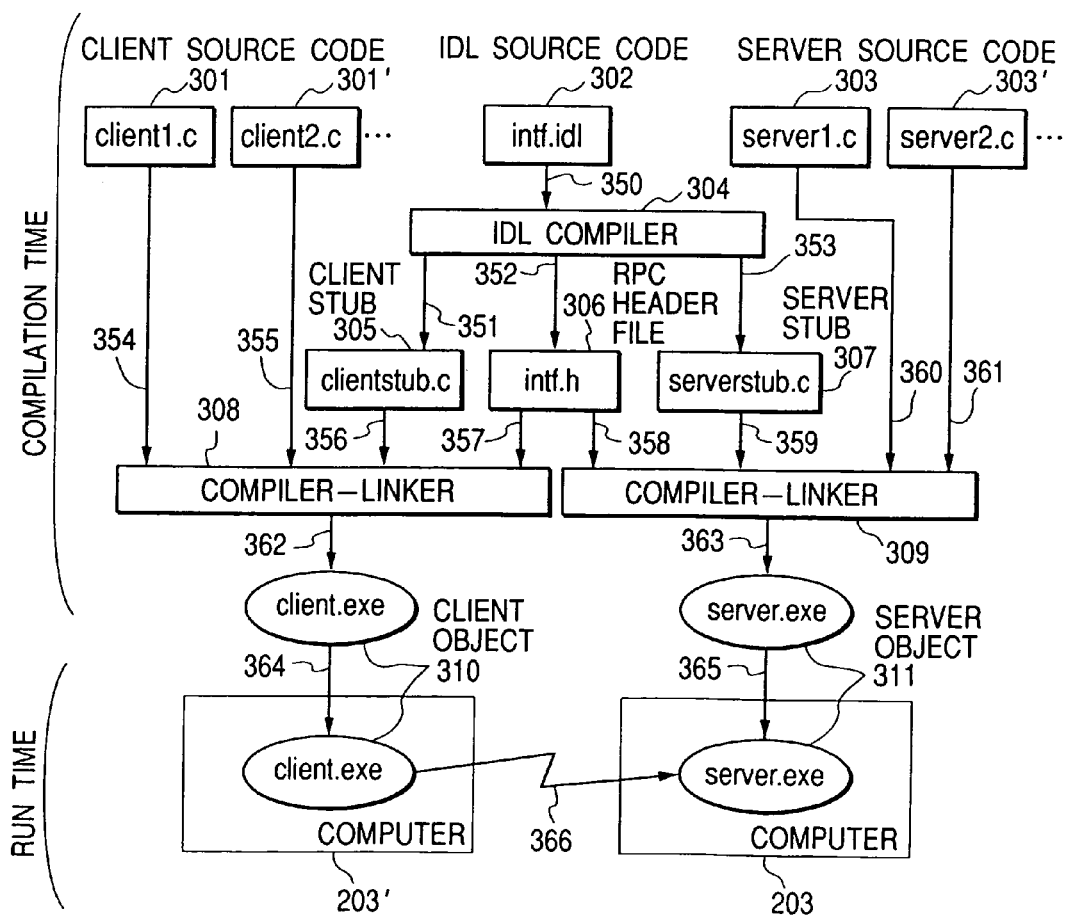
FIG. 3 is a block diagram showing how remote procedure calls are compiled and run conventionally.
Figure 4:
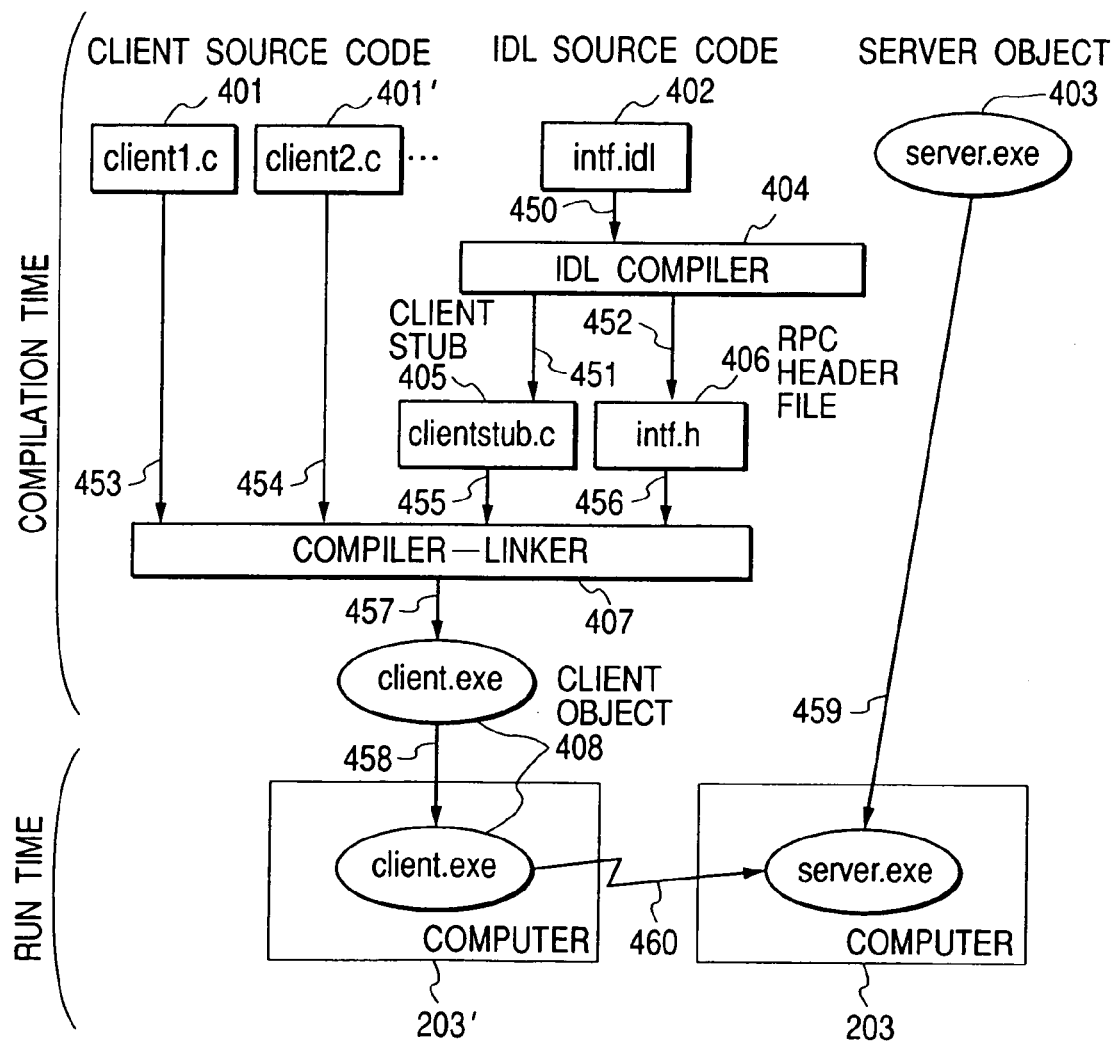
FIG. 4 is a block diagram depicting how remote procedures are compiled and run conventionally by use of a compiled server.

FIGS. 3 and 4 show conventional flows of compilation and run in which clients and servers perform RPCs in a manner different from that of the embodiment above. The conventional setup is described below to promote a better understanding of the invention.

An IDL compiler 304 accepts an IDL source code 302 as its input (350) and outputs (351, 352, 353) a client stub 305, an RPC header file 306, and a server stub 307.

A compiler-linker 308 compiles and links (354, 355, 356, 357) client source codes 301, 301', etc., client stub 305, and RPC header file 306 into a client object 310 that is the client's executable program to be output (362). A compiler-linker 309 compiles and links (358, 359, 360, 361) server source codes 303, 303', etc., server stub 307, and RPC header file 306 into a server object 311 that is output (363). This is what takes place at compilation time.

In the run-time example of FIG. 3, the client object 310 is executed (364) on the computer 203' while the server object 311 is executed (365) on the computer 203. An RPC that takes place at run time (366) is a remote procedure previously declared in the IDL source code 302.

Distributed object techniques such as CORBA illustratively permit a compile-and-run arrangement in which a server is a package offered in the form of a compiled program. Here, the server compiles clients and get them to communicate with the server. One such compile-and-run setup is shown in FIG. 4.

An IDL compiler 404 accepts an IDL source code 402 as its input (450) and outputs a client stub 405 (451) and an RPC header file 406 (452).

A compiler-linker 407 compiles and links (453, 454, 455, 456) client source codes 401, 401', etc., client stub 405, and RPC header file 406 into a client object 408 that is the client's executable program to be output (457). This is what takes place at compilation time.

In the run-time example of FIG. 4, the client object 408 is executed by a user on the computer 203' (458) while the server object 403 is executed likewise on the computer 203 (459). An RPC (460) that takes place at run time is a remote procedure previously declared in the IDL source code 402.

Internal Structure

Figure 5:
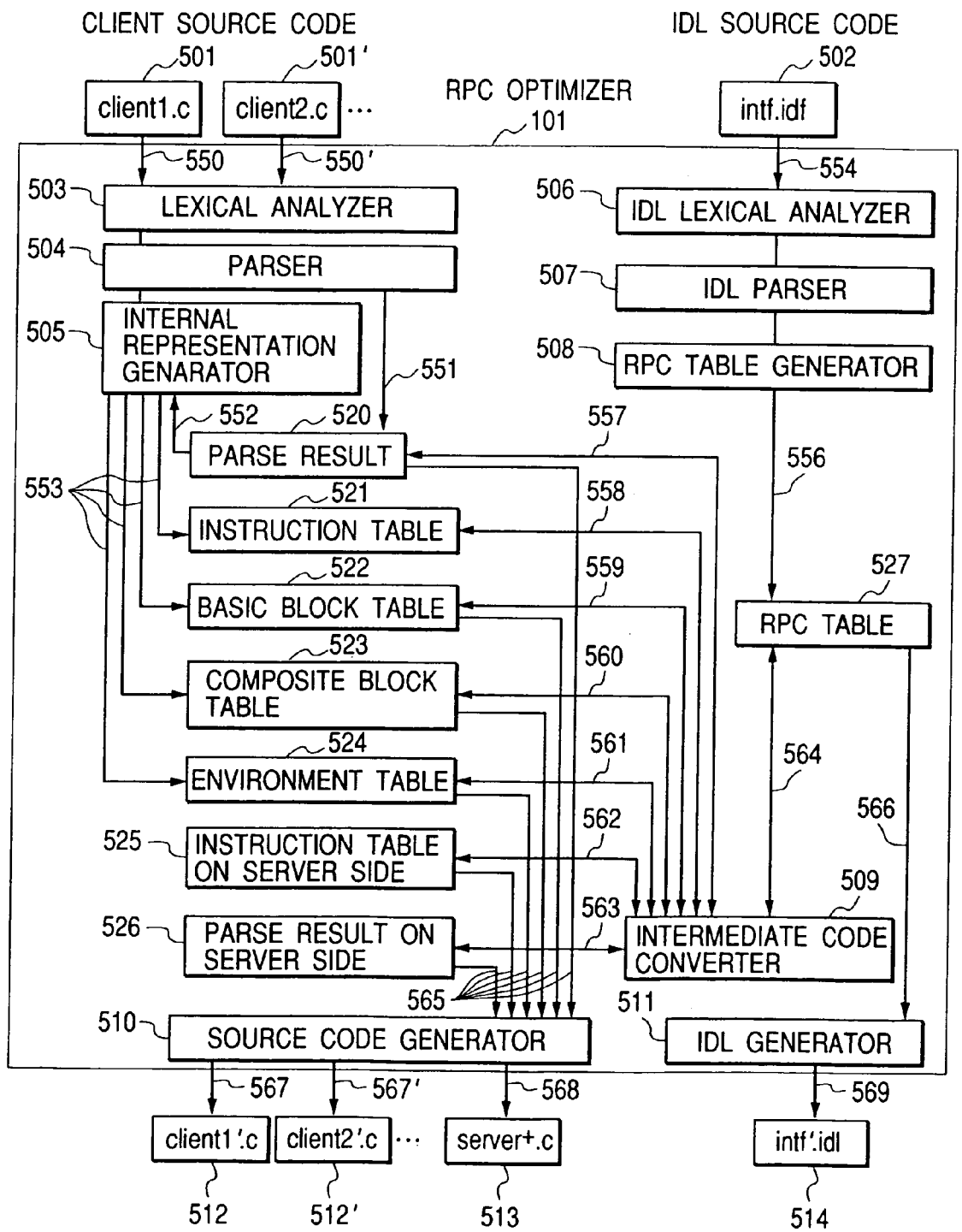
FIG. 5 is a block diagram of an RPC optimizer.

An internal structure of the RPC optimizer 101 according to the invention will now be described with reference to FIG. 5. The RPC optimizer 101 comprises a lexical analyzer 503, a parser 504, an internal representation generator 505, an IDL lexical analyzer 506, an IDL parser 507, an RPC table generator 508, an intermediate code converter 509, a source code generator 510, and an IDL source code generator 511.

The lexical analyzer 503 receives client source codes 501, 501', etc., as its inputs (550, 550', etc.,) for lexical analysis. Characters making up the client source codes 501, 501', etc., are analyzed in detail and broken down into word strings such as reserved words, names (of variables, procedures, etc.), delimiters and constants. Such lexical analysis is a well-known technique discussed illustratively by A. Aho and J. Ullman in "Principles of Compiler Design" (Addison-Wesley Publishing Company, April 1977, p. 10; referred to as the Cited Reference 3 hereunder). At the lexical analysis stage, it may be a good practice to record which word string came from which client source code in order to facilitate subsequent generation of new client source codes 512, 512', etc.

The parser 504 receives the word strings output by the lexical analyzer 503, arranges the received word strings into a data structure called a parse tree in accordance with the syntax of the client source code language, and stores (551) the data structure into a parse result 520. A parse tree is a data structure for representing such syntax elements as expressions, statements, blocks, procedures and programs. Because many programming languages are context-free languages (or close to them) that permit recursive syntax, a majority of parse trees are made up of data structures capable of representing recursive structures such as tree structures. Parse processing or parsing is a well-known practice discussed illustratively in the Cited Reference 3 (p. 12). The construction of the parse result 520 is a tree structure representing client source codes 501, 501', etc., in keeping with the structure of the source code language (e.g., type declarations, procedure definitions, statements, expressions, variables, constants).

The internal representation generator 505 receives as its input (552) the parse result 520 output by the parser 504, breaks down what is received and reorganizes it into data structures suitable for optimization. The resulting data structures are stored. This processing is another well-known practice called intermediate language generation described illustratively in the Cited Reference 3 (p. 13). The internal representation generator 505 outputs (553) four data structures: an instruction table 521, a basic block table 522, a composite block table 523, and an environment table 524. These internal structures, to be described later in detail with reference to FIG. 6, are outlined below.

Of the elements constituting the parse tree, the instruction table 521 has a data structure representing executable statements each in a number of sequences of basic instructions (references, operations such as additions and subtractions, assignments, procedure calls, branches, iterations, etc.). As opposed to the instruction table 521, the basic block table 522 retains basic instruction sequences divided into groups called basic blocks in terms of control structures such as branches and iterations. The concept of basic blocks is discussed illustratively in the Cited Reference 3 (p. 412). The composite block table 523 accommodates a data structure representing a number of related basic blocks, such as a single procedure and source code blocks (e.g., statements from an opening inner parenthesis to the corresponding closing parenthesis in C, or statements from "begin" to "end" in Pascal). The environment table 524 stores information about variables used in basic blocks and composite blocks.

The IDL lexical analyzer 506 receives an IDL source code 502 as its input (554) for lexical analysis of the IDL source code. That is, characters making up the IDL source code 502 are analyzed in detail and broken down into word strings such as reserved words, names (of variables, procedures, etc.), delimiters and constants.

The IDL parser 507 receives the word strings output by the IDL lexical analyzer 506 and arranges the received word strings into a data structure called a parse tree in accordance with the syntax of the IDL. Because the IDL is mostly composed of declarations, the parse tree primarily contains type declarations and procedure declarations.

The RPC table generator 508 rearranges the output of the IDL parser 507 into user-defined type declarations as well as RPC interfaces made of procedure names of RPCs, input arguments (data transferred from client to server at the start of RPC), and output arguments (data returned by server to client at the end of RPC, including returned values of RPC). The rearranged result is stored (556) into an RPC table 527. If the output of the IDL parser 507 includes type declarations, they are also placed into the RPC table 527. The internal structure of the RPC table 527, to be described later in detail with reference to FIG. 6, constitutes a data structure that lists the RPC interface type included in the IDL source code 502 as well as the user-defined type declarations.

Figure 11:
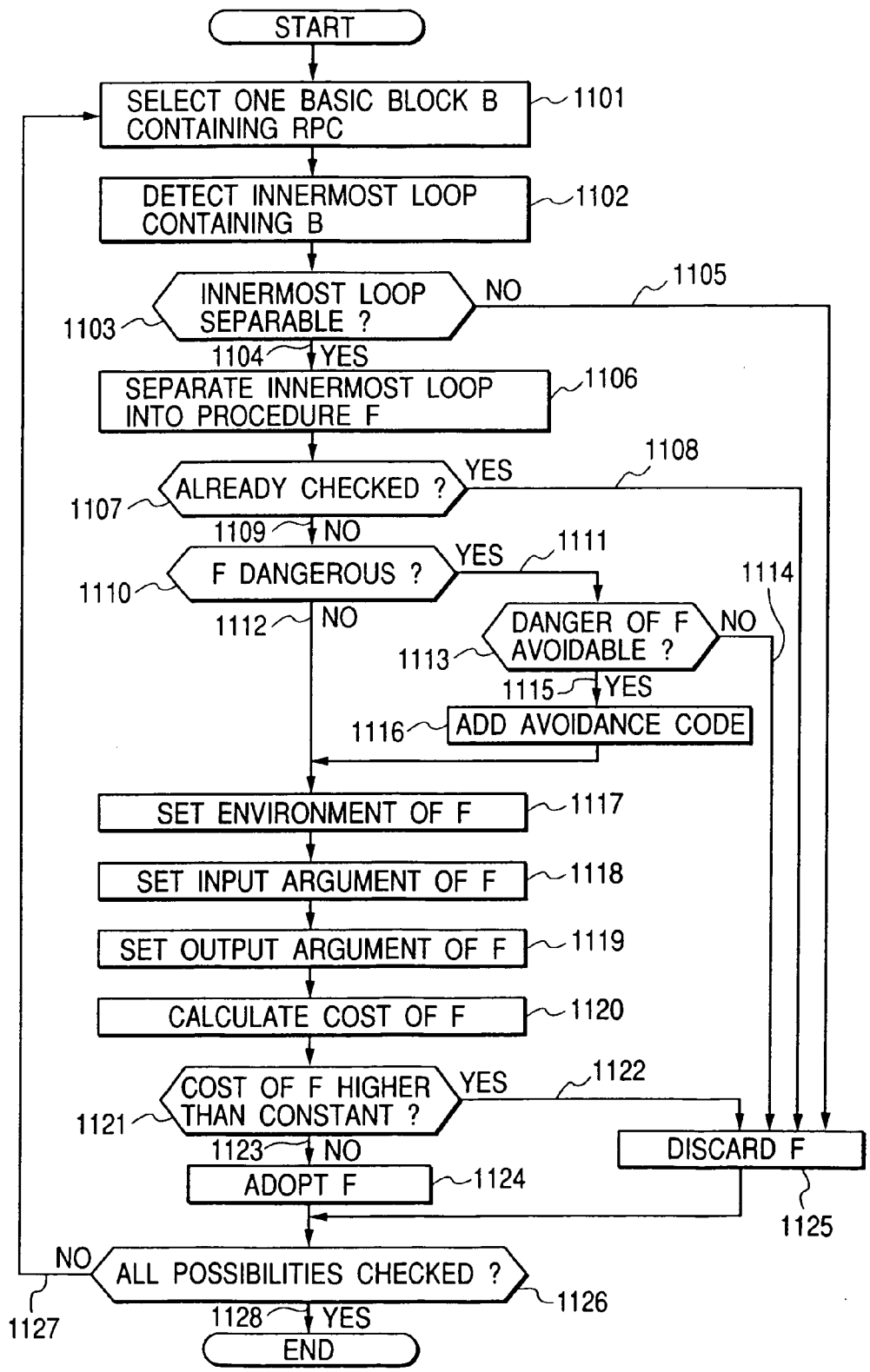
FIG. 11 is a flowchart of steps constituting a method (first method) for detecting an RPC executed repeatedly in a loop.
Figure 12:
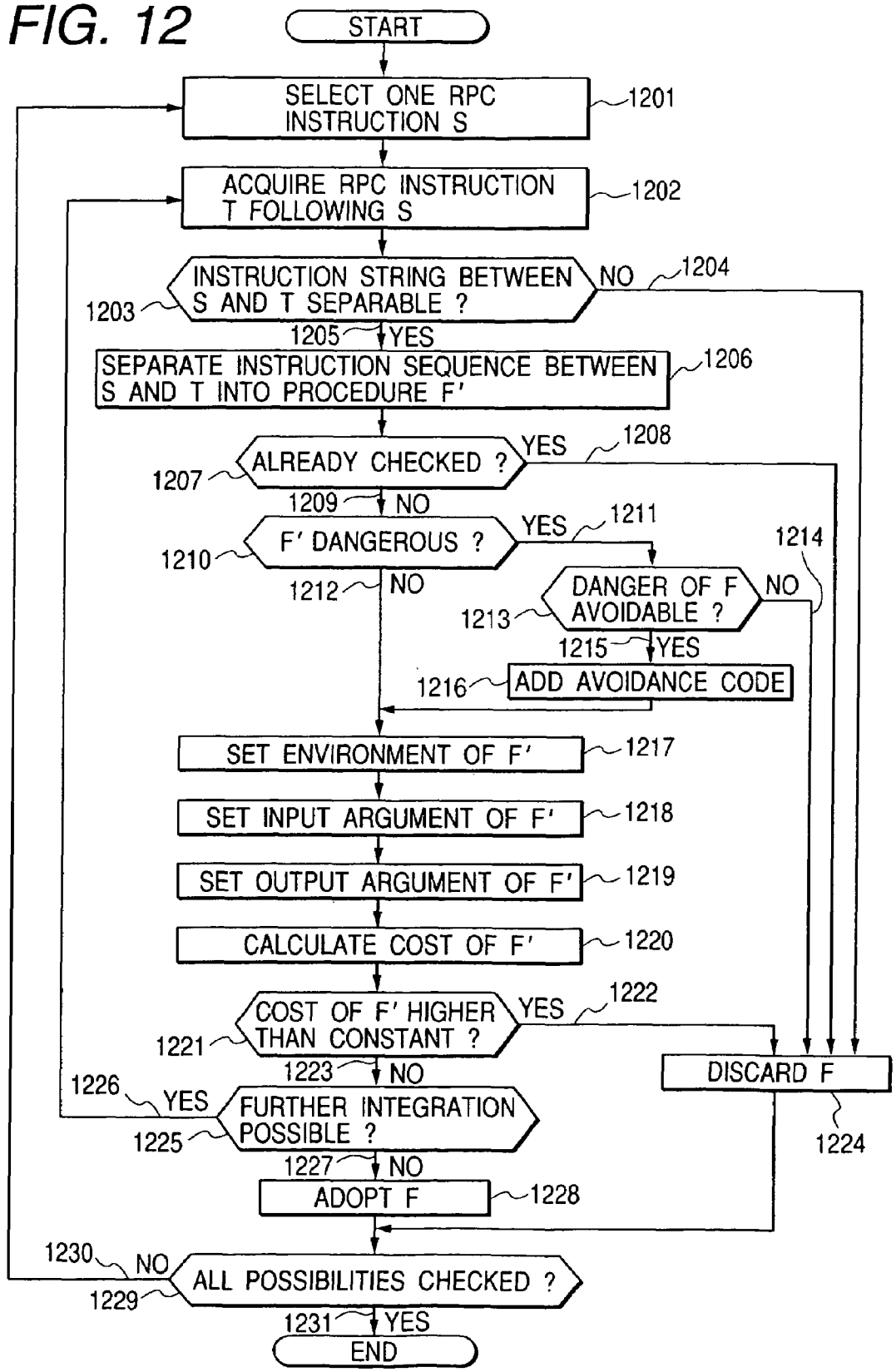
FIG. 12 is a flowchart of steps constituting a method (second method) for detecting that portion of a basic instruction sequence which comprises at least two RPCs.

The intermediate code converter 509 optimizes RPCs using the parse result 520, instruction table 521, basic block table 522, composite block table 523, environment table 524, and RPC table 527. The workings of the intermediate code converter 509, to be described later in detail with reference to FIGS. 11 and 12, are outlined below. The intermediate code converter 509 checks the instruction table 521 against the RPC table 527 (558, 564). In so doing, the intermediate code converter 509 detects from among the basic instruction sequences in the instruction table 521 a first basic instruction sequence wherein RPCs occur frequently. The first basic instruction sequence thus detected is integrated into a new, first procedure. This embodiment utilizes two methods for detecting basic instruction sequences in which RPCs often take place. The first method involves detecting RPCs that are executed repeatedly in a loop. The second method involves detecting portions each having at least two RPCs which appear in part or all of the basic instruction sequences in basic blocks. These two methods are described here merely as representative examples and are not limitative of the invention. Other methods are also conceivable, including one which calculates the ratio of RPCs to the other elements in a given basic instruction sequence in order to detect a portion where the proportion of the RPCs is higher than a predetermined level. Another method may involve moving RPCs in keeping with localized code optimization so that initially distributed RPCs may be relocated closer to one another. Part or all of these methods may also be used in combination.

The first instruction sequence is removed from the instruction table 521, and a basic instruction sequence for calling the first procedure is inserted instead into the instruction table 521 (558). The parse result 520 is changed accordingly (557). If there are changes in the structures of basic blocks, composite blocks or variable groups, then the basic block table 522, composite block table 523 or environment table 524 is modified correspondingly (559, 560, 561).

The basic instruction sequence constituting the first procedure is supplemented by a first portion (mainly for operating on input arguments) and a last portion (primarily for operating on output arguments and for moving control), both needed for a procedure, before being stored (562) into an instruction table 525. Located on the server side, the instruction table 525 has the same structure as the instruction table 521. That part of the parse result 520 which corresponds to the first basic instruction sequence is moved to a parse result 526 on the server side. The part in question of the parse result 520 is likewise supplemented (563) by a first and a last portion needed for a procedure. The interface of the first procedure is placed (564) into the RPC table 527.

The input arguments of the first procedure constitute a group of variables used by the first basic instruction sequence and defined outside the latter. The output arguments of the first procedure constitute a group of variables defined or modified in the first basic instruction sequence and referenced by basic instructions other than the first basic instruction sequence. As a result, the variables referenced or modified in the first procedure function in the same manner as they did before they were integrated into the first procedure. When the RPC detects a basic instruction sequence wherein RPCs occur frequently and tries to integrate them, the quantity of data made of the input and output arguments can be too large to let integrating efficiency remain unimpaired. In such a case, the attempt at integration is stopped.

The integrating steps above are repeated and, when no further integration is regarded as viable, the intermediate code converter 509 is terminated.

The source code generator 510 outputs (565) new client source codes 512, 512', etc., and an additional server source code 513 using the parse result 520, parse result 526 on the server side, instruction table 521, instruction table 525 on the server side, basic block table 522, composite block table 523, and environment table 524 which were modified by the intermediate code converter 509. This is a process common to what is called source code printing from a parse tree point of view. Specifically, a search is made through the parse result 520 or the server-side parse result 526 with priority given to depth. Nodes of the tree structure are converted to a source code in the sequence in which they were passed during the search, and the resulting source codes are output. Since the nodes are each a basic element of the source code language (i.e., any of monadic operations, dyadic operations, variable references, "if" statements, "for" statements, assignment statements, procedure calls, blocks, procedures, programs, etc.), each node is converted to a source code automatically. Principally, the new client source codes 512, 512', etc., are generated (567, 567') from the parse result 520, and the additional server source code 513 is generated (568) from the parse result 526 on the server side.

The IDL source code generator 511 generates a new IDL source code 514 (566, 569) from the RPC table 527. Because the RPC 527 has a data structure in which the IDL source code 502 is translated and retained, the IDL source code generator 511 need only reverse the operation of the table generator 508 to reconstitute the IDL from the contents of the RPC table 527. Since the RPC table 527 has undergone changes by the intermediate code converter 509 for optimization, the newly output IDL source code 514 comprises not only the RPC interface declared in the new IDL source code 106 but also any RPC interface added by the intermediate code converter 509 as a result of the optimization.

Data Structure

Described below with reference to FIG. 6 are data structures of the instruction table 521, basic block table 522, composite block table 523, environment table 524, RPC table 527, and a variable table 660.

An instruction table 600 in the figure shows a typical structure of the instruction table 521. The instruction table 600 comprises at least one instruction table element 601 which represents one basic instruction. The instruction table element 601 also has five fields: an instruction ID 602, a target 603, an instruction 604, an operand A 605, and an operand B 606. The instruction ID 602 is a number attached to the instruction table element 601. The target 603, operand A 605 and operand B 606 represent variables and names of data storage areas. The instruction 604 is a basic instruction type that represents monadic operations (minus, logical NOT, etc.), dyadic operations (additions, subtractions, multiplications, divisions, dyadic logical operations, structure references, etc.), conditional branches, unconditional branches, procedure call argument designation, procedure calls, and assignments. The operand A 605 and target 603 represent operation targets, and the operand B 606 denotes arguments for the instruction 604. Depending on the type of the basic instruction, these elements have different meanings when interpreted. For example, a basic instruction "IF A RELOP B GOTO L" specifies that "IF RELOP GOTO" be set to the instruction 604, that A and B be set to the operand A 605 and operand B 606 respectively, and that L be placed into the target 603.

A basic block table 610 in the figure represents a typical structure of the basic block table 522. The basic block table 610 comprises at least one basic block table element 611. The basic block element 611 includes 14 fields: a basic block ID 612, a start instruction ID 613, an end instruction ID 614, a next basic block 615, a preceding basic block 616, an environment ID 617, a DGEN variable table 618, a DKILL variable table 619, a DIN variable table 620, a DOUT variable table 621, a LIN variable table 622, an LOUT variable table 623, a LUSE variable table 624, and an LDEF variable table 625.

The basic block ID 612 is a number that identifies a given basic block. The start instruction ID 613 is the instruction ID 602 of a first basic instruction in a basic instruction sequence corresponding to the basic block in question. The end instruction ID 614 is the instruction ID 602 of a last basic instruction in the basic instruction sequence corresponding to the current basic block. The next basic block 615 is the basic block ID of the next basic block. The preceding basic block 616 is the basic block ID of the preceding basic block. The next basic block 615 and the preceding basic block 616 may each accommodate two or more basic block IDs. The environment ID 617 denotes the environment table 524 that stores a group of variables corresponding to the basic block in question.

The DGEN variable table 618, DKILL variable table 619, DIN variable table 620, DOUT variable table 621, LIN variable table 622, LOUT variable table 623, LUSE variable table 624, and LDEF variable table 625 each have the structure of a variable table 660, to be described later.

The DGEN variable table 618 is a variable table 660 that stores defined locations for a group of variables newly defined in the basic block in question. The DKILL variable table 619 is a variable table 660 that stores defined locations for a group of variable having lost their definitions in the basic block. The DIN variable table 620 is a variable table 660 that stores defined locations for a group of variable defined prior to the current basic block. The DOUT variable table 621 is a variable table 660 that stores defined locations for a group of variables that are likely to be referenced from the next basic block. A known calculating method, illustratively the one discussed in the Cited Reference 3 (pp. 431-433), is used for the DGEN variable table 618, DKILL variable table 619, DIN variable table 620 and DOUT variable table.

The LIN variable table 622 is a variable table 660 that stores defined locations for a group of variables referenced in the basic block in question or from any basic block subsequent to that basic block. The LOUT variable table 623 is variable table 660 that stores a group of variables referenced from any basic block subsequent to the basic block in question. The LUSE variable table 624 is a variable table 660 that stores a group of variables referenced in the basic block. The LDEF variable table 625 is a variable table 660 that stores a group of variables defined in the current basic block and referenced from the next block or from subsequent blocks. A known calculating method, illustratively the one described in the Cited Reference 3 (pp. 489-490), is used for the LIN variable table 622, LOUT variable table 623, LUSE variable table 624 and LDEF variable table 625.

A composite block table 630 in the figure shows a typical structure of the composite block table 523 representing a number of related basic blocks being grouped together. The composite block table 630 is an array made of at least one composite block table element 631. A composite block ID 632 is a number that identifies a given composite block. A start basic block ID 633 stores the basic block ID 612 of a first basic block in the composite block in question. An end basic block ID 634 stores the basic block ID 612 of an end basic block in the composite block in question. An environment ID 635 denotes the environment table 524 that stores a group of variables associated with the composite block in question.

An environment table 640 in the figure shows a typical structure of the environment table 524 that stores information about variables for use within basic or composite blocks. There may be a plurality of environment tables each identified by an environment ID 641. For many programming languages, the effective scope of variables is provided in a hierarchical structure. A parent environment ID 642 represents one such hierarchical structure. Attributes 643 hold various kinds of load information applicable to the environment table in question. An intra-environment variable table 644 stores information about at least one variable retained in the environment table. The structure of the intra-environment variable table 644 corresponds to that of the variable table 660, to be discussed later.

An RPC table 650 in the figure comprises procedure names of RPCs, input arguments and output arguments. As such, the RPC table 650 represents the structure of the RPC table 527 that stores RPC interfaces and user-defined type declarations. The RPC table 650 comprises zero or at least one RPC table element 651, and zero or at least one type declaration element 658. One RPC table element 651 corresponds to one RPC interface and includes an RPC name 652, an IN argument table 653, an OUT argument table 654, and attributes 655. The RPC name 652 represents the name of the RPC, the IN argument table 653 comprises input arguments for the RPC interface in question, and the OUT argument table 654 includes output arguments for the RPC interface in question. The IN and OUT argument tables 653 and 654 each have the structure of the variable table 660, to be described later. The attributes 655 retain additional information about the RPC interface in question. Typical additional information may include information about exceptions or about environment variables. Where the IDL is to be extended as described earlier, the additional information may be information usable for optimizing RPCs. A type declaration element 658 represents one user-defined type, and comprises a type name 656 and type information 657. The type name 656 is self-explanatory, and the type information 657 represents the structure of the type with the type name 656 by use of other type declaration elements and basic types.

The variable table 660 is an array that retains names of variable groups and load information. The variable table 660 comprises at least one variable table element 661. The variable table element 661 includes a variable name 662, a type 663 and attributes 664.

The parse result 520 and the server-side parse result 526, i.e., the ways in which parse trees are realized, are described in many publications including the Cited Reference 3. There are also tools which, not described here, are used frequently for semiautomatic generation of parse trees.

Examples of Optimization

How RPCs are optimized by the RPC optimizer 101 will now be described by referring to FIGS. 7, 8, 9 and 10. "intf.idl" 700 is a typical ID source code. Lines 701 through 704 constitute a body of the source code. Line 701 collectively declares an RPC interface group by furnishing it with a name "MyServer." A server object defined by the IDL source code has a type called "MyServer." Line 702 defines an interface for a first remote procedure "func1" included in "MyServer." This line defines types of arguments and returned values for "func1." Illustratively, "func1" takes one input argument (designated by reserved word "in") whose type is "int" (integer) and which is named "i." Returned values of "func1" also have the "int" type. Likewise, line 703 defines an interface for a second remote procedure "func2" included in "MyServer." "func2" takes an argument "key" and an argument "value." The argument "key" is "inout," i.e., an input and output argument. The argument "value" is an input argument.

"client1.c" 750 is a typical source code of a client that uses the server defined in "intf.idl" 700. This source code is described in C++. Line 751 reads an IDL header file "intf.h" 800, to be discussed later. The IDL header file "intf.h" 800 defines the "MyServer" type. Lines 752 through 762 constitute a defined body of a "main" function which is the beginning of the client in question. For a better understanding of this definition, a number of typical library functions are used. Line 754 provides a process in which the client searches for a server it will use by utilizing a library function retrieved from a name service or a dictionary. Here, a server of the "MyServer" type is acquired by designating the name "MyServer" to call up a "lookupDirectory" library function. Line 755 defines a local variable "count" and initializes it to zero. Lines 756 through 758 constitute an iteration process effected by a "for" statement. In this process, the remote procedure "func1" of the "MyServer" type server is called up. Specifically, 100 RPCs are carried out by having the input argument "i" varied from 0 to 100. At the same time, returned values of "func1" are added to "count." Line 759 is a library "printf" function to which the value of "count" is output. Line 760 calls up another remote procedure "func2" of the server. Line 761 calls "func1" of the server. The above steps make up the process of the client in question. For this client, a total of 102 RPCs are executed.

If remote procedures are conventionally compiled as shown in FIG. 3, the IDL compiler 304 outputs "intf.h" 800, "clientstub.c" 850 and "serverstub.c" 900 from "intf.idl" 700. "intf.h" 800, "clientstub.c" 850 and "serverstub.c" 900 correspond respectively to the RPC header file 306, client stub 305 and server stub 307. In this example, "intf.h" 800, "clientstub.c" 850 and "serverstub.c" 900 are described in C++. The conversion shown here is only for illustration, and "intf.h" 800, "clientstub.c" 850 and "serverstub.c" 900 that are output may vary from system to system.

A file "intf.h" 800 stores a type declaration of a "MyServer" type object. Line 801 reads "Object.h," a file that contains a declaration of an "Object" type used as a parent class of the object that performs RPCs. In this example, the "Object" type provides a method "call" by which the server and the client communicate (the method "call" will be described later). Line 802 declares the object of the "MyServer" type to be a child class of the "Object" type. Line 803 declares a method "func1" that has translated into C++ the remote procedure "func1" defined in line 702 of "intf.idl" 700. An argument "i" is of the "int" type, and so are returned values. Line 804 declares a method "func2" that has translated into C++ the remote procedure "func2" declared in line 703 of "intf.idl" 700.

An argument "key," which is both an input and an output argument, is declared by use of a C++ reference type (designated by symbol "&"). An argument "value," which was declared as the "String" type in "intf.idl" 700, is declared as a "char*" type (pointer to a character type) because it has no corresponding type in C++. Line 805 designates the end of the "MyServer" type declaration.

A file "clientstub.c" 850 stores defined bodies of two methods "func1" and "func2" of the "MyServer" type declared in "intf.h" 800. The definitions held in the file "clientstub.c" 850 are used by a client and constitute a calling-side code of an RPC. That is, when called by a first function within the client, "func1" and "func2" of the file "clientstub.c" 850 pack an input argument into a communication packet, send the packet to the server, wait for a response from the server, retrieve an output argument from a communication packet sent in by the server, and return the retrieved argument to the first function. More specifically, line 851 reads "intf.h" 800 to obtain "MyServer" type declarations. Lines 852 through 861 define "func1" and lines 862 through 870 define "func2." Line 852 declares the method "func1" of the "MyServer" type to be a function that takes an "int" type input argument and returns an "int" type value.

Line 854 assigns anew to a memory area a communication packet "buf" for communicating with the server. The packet "buf" is of a buffer type that permits operations for packing a communication packet with values of diverse types and for retrieving values of various types from the packet. Line 855 declares a local variable "vral." Line 856 stores an argument "i" into the packet "buf" using a method "packint" for packing integer type values into packets. Line 857 executes communication with the server using a "call" method offered by the "Object" type which is the parent class of "MyServer." At this point, the method "call" is provided with "func1," i.e., name of the remote procedure to be started by the server, and with the packet "buf" containing an input argument. The method "call" transmits the remote procedure name "func1" and the packet "buf" to the server and waits for a response therefrom. A response given by the server is placed back into the packet "buf." Line 858 retrieves a returned value of the "int" type from with the server's response and assigns the value to the local variable "rval." In this case, "unpackint" offered by the buffer type is used. Line 859 clears the memory space for the communication packet "buf" that is no longer necessary. Line 860 regards the value in the local variable "rval" as the returned value of "func1" and passes control back to the source of the call. Line 862 declares that the method "func2" of the "MyServer" type takes input arguments of a "long" reference type and a "char" pointer type and that the method is a function with no returned values. Line 864 newly assigns to a memory area the communication packet "buf" for communication with the server. Line 865 stores the value of the argument "key" into the packet "buf" using a method "packlong" for packing values of the "long" type into that packet. Likewise, line 866 packs a character string designated by the argument "value" into the packet "buf" using a method "packString" for packing character strings. Line 867 executes communication with the server using the "call" method. Line 868 retrieves an output argument of the "long" type from within the response sent in by the server, and assigns the value to the argument "key." In this case, a method "unpacklong" offered by the buffer type is used. Line 869 clears the memory space for the communication packet "buf" that has become unnecessary. Line 870 passes control back to the source of the call.

"serverstub.c" 900 retains a server loop, i.e., a code for calling two methods of the "MyServer" type declared in "intf.h" 800. The server loop is a code used by the server on the side that receives an RPC. The server waits for an RPC from a client in an infinite loop. When an RPC request arrives, the type of the requested RPC is identified and a body of the appropriate remote procedure is called up accordingly. Programmers for the server prepare source codes of "func1" and "func2" and, in combination with "serverstub.c" 900, compile them and link them into an executable program for the server. Detailed steps of the compilation and linkage are described below.

Line 901 reads "intf.h" 800 to obtain a "MyServer"type declaration. Lines 902 through 928 constitute a definition of the server loop. Line 902 declares the server loop "loop" to be a function with neither arguments nor returned values. Lines 904 through 927 make up the infinite loop. Line 905 declares a communication packet "buf" and line 906 declares a type for storing communication information (IP address, port No., communication connection, user information, etc.) of a client. Line 907 designates a stop and waits for an RPC request that will arrive upon a client's call. If an RPC request is received from a client, then a first and a second argument of the call, i.e., the name of the remoter procedure to be called and the input argument, are stored into a "Client" type object to which information about the client in question is assigned as well as into a "Buffer" type object to which a new memory area is assigned. These objects are designated by "client" and "buf." In line 908, a check is made to see if the name of the remote procedure to be started is "func1." If the name is found to be "func1" in line 908, then local variables necessary for the process are defined (in line 909). Because "int" type data (input argument of "func1") are held in the packet "buf," the data are retrieved (in line 910), and "func1" is called up (in line 911). A returned value of "func1" is again packed into the package "buf" (in line 912). In line 913, a check is made to see if the name of the remote procedure to be started is "func2." If the name is found to be "func2" in line 913, then local variables necessary for the process are defined (in lines 914 and 915). "long" type data (input argument of "func2") are retrieved (in line 916), and then "char" pointer type data (input argument of "func2") are retrieved (in line 917). The two input arguments are used in line 918 for calling "func2." Line 919 again packs the value of "key" (output argument) into the packet "buf." If the name of the remote procedure to be started is found to be neither "func1" nor "func2" in line 920, then an error is transmitted to the client (in line 921), and the infinite loop is repeated (in line 922). Finally, line 924 causes a response to be sent to the client in question, and lines 925 and 926 clear the data that have become unnecessary.

Described above have been examples of inputs and outputs effected by the IDL compiler in compiling remote procedure calls in a conventional manner.

"intf'.idl" 1000, an example of an IDL source code modified by the RPC optimizer, corresponds to the new IDL source code 106 in FIG. 1. Lines 1001 through 1006 constitute a body of the source ode. Line 1001 collectively declares an RPC interface group by furnishing it with a name "MyServer." The server object defined by use of this IDL source code has a type named "MyServer." Lines 1002 and 1003 declare "func1" and "func2" as in the case of "intf.idl" 700. Lines 1004 and 1005 declare two remote procedures added by the RPC optimizer 101 for optimization. Arguments of "func3" are variables "count" of an "int" type which are input and output arguments with no returned values. Arguments of "func4" are variables "i" of the "int" type which are input arguments.

"clientstub'.c" 1010, a client's source code modified by the RPC optimizer 101, corresponds to new client source codes 105, 105', etc., in FIG. 1. These source codes are described in C++. Line 1011 reads an IDL header file generated by "intf'.idl" 1000. Line 1012 starts a definition of a "main" function that is the beginning of the client in question. Lines 1012 through 1019 constitute a body of the definition of the "main" function. For a better understanding of this definition, a number of typical library functions are used. Line 1014 provides a process in which the client searches for a server it will use by utilizing a library function retrieved from a name service or a dictionary. Here, a server of the "MyServer" type is acquired by designating the name "MyServer" to call up the "lookupDirectory" library function. Line 1015 defines a local variable "count" and initializes it to zero. Line 1016 calls "func3," a remote procedure of the server of the "MyServer" type. In this case, with the input argument "i" varied from 0 to 100 by "client.c" 750, 100 repetitive RPCs are integrated into a single RPC for optimization. Line 1017 provides a library "printf" function that outputs the value of "count." This line is the same as its counterpart in "client.c" 750. Line 1018 changes those portions calling up "func2" and "func1" in the client source codes 102, 102', etc., into a single RPC for "func4." Described so far has been the process performed by the client after the optimization. This client carries out a total of two RPCs.

"server+.c" 1030, the server's additional source code generated by the RPC optimizer 101, corresponds to the additional server source code 107 shown in FIG. 1. "server+.c" 1030 accommodates a connecting source code interposed between the existing source code of the server object and the interface of the remote procedure added by the RPC optimizer 101. Line 1031 reads an IDL header file generated by "intf'.idl" 1000. Lines 1032 through 1036 define "func3" and lines 1037 through 1041 define "func4." As in conventional cases, the definitions of "func1" and "func2" are prepared by programmers for the server. Line 1032 declares that the function "func3" is of an "int" reference type without returned values. Lines 1034 and 1035 repeat 100 calls to "func" using a local variable "i" and store the sum of returned values in "count." The local variable "i" is not treated as an output variable because it has not been used after the "for" statement in "client.c" 750. If the local variable "i" has been used since the "for" statement in "client.c" 750, the last value of the variable "i" in "func3" is returned to the client as an output argument. Line 1037 takes an "int" type input argument and declares "func3" without returned values. Lines 1039 and 1040 call up "func2" and "func1" respectively. The arguments of "func2" are packed with constants used in the client source codes 102, 102', etc.

The foregoing have been illustrations of "intf'.idl" 1000, "clientstub'.c" 1010 and "server+.c" 1030, i.e., examples of RPC optimization by the RPC optimizer 101.

Flows of Internal Processes

Details of internal processing by the RPC optimizer 101 are described below. As already discussed in reference to FIG. 5, the RPC optimizer 101 comprises the lexical analyzer 503, parser 504 and internal representation generator 505 which generate the parse result 520, instruction table 521, basic block table 522, composite block table 523, and environment table 524. Also included in the RPC optimizer 101 are the IDL lexical analyzer 506, IDL parser 507 and RPC table generator 508 which generate the RPC table 527. The intermediate code converter 509 optimizes RPCs by use of these tables, creating and modifying the server-side instruction table 525 and server-side parse result 526 during the process. Lastly, the source code generator 510 and IDL source code generator 511 generate and output the new client source codes 512, 512', etc., additional server source code 513, and new IDL source code 514 based on the parse result 520, instruction table 521, basic block table 522, composite block table 523, environment table 524, RPC table 527, server-side instruction table 525, and server-side parse result 526. Of these internal processes, the one performed by the intermediate code converter 509 is particularly important for the RPC optimizer 101. Details of the process carried out by the intermediate code converter 509 are described below. For purpose of simplification and illustration, the description that follows will focus on a case where the environment is not nested. However, this is not limitative of the scope of the invention.

The intermediate code converter 509 detects, from among basic instruction sequences in the instruction table 521, a first basic instruction sequence wherein RPCs occur frequently. As described above, the detection is carried out by one of two methods: the first method involves detecting RPCs that are executed repeatedly in a loop; and the second method involves detecting portions each having at least two RPCs which appear in part or all of the basic instruction sequences in basic blocks.

How the detecting process is performed by the first method will now be described with reference to FIG. 11. In step 1101, one basic block (indicated by B hereunder) containing an RPC is selected. This is a step where one basic block is selected from the basic block table 522 and where a check to be described below is performed on each of the instruction table elements 601 in the instruction table 521, ranging from a start instruction ID 613 to an end instruction ID 614 of the basic block in question. An instruction 604 first retrieves a basic instruction "procedure call" and treats the target 603, i.e., the name of the procedure to be called, as a first procedure name. Each of the RPC table elements 651 in the RPC table 527 is checked against the RPC name 652 of the RPC table element in question. If the RPC name 652 is found to be the same as the first procedure name, that means the basic block includes the RPC. When basic blocks are to be selected successively from within the basic block table 522, the process of following a tree structure (called a traverse) is carried out by use of the next basic block 612 and preceding basic block 616 relative to each basic block. The above step provides the basic block B.

In step 1102, the innermost loop including the basic block B is detected. The basic block group contained in the basic block table 522 forms a directed graph based on the next basic blocks 615. The way of detecting loops from the directed graph is well known (discussed illustratively in the Cited Reference 3, p. 445) and will not be described further. Of the detected loops, the innermost loop including the basic block B is the loop that has the smallest number of sides.

In step 1103, a check is made on the basic instruction sequence of the innermost loop to see if the loop may be separated. If the result of the check in step 1103 is affirmative (1104), step 1106 is reached. If the result in step 1103 is negative (1105), step 1125 is reached. The innermost loop cannot be separated if it contains a function call other than the RPC.

In step 1106, the innermost loop is separated into a procedure F. A new composite block table element is initialized for the procedure F. A first composite block table element is added anew to the composite block table 523. A number different from that of any existing composite block is assigned to the composite block ID 632 of the first composite block table element. The ID of the first basic block in the innermost loop is placed into the start basic block ID 633, and the ID of the end basic block in the innermost loop is stored into the end basic block ID 634. A new environment table 524 is allocated as a first environment table. A number different from that of any other environment table is assigned to the environment ID 641 of the first environment table. The attributes 643 of the environment IDs 617 for all basic blocks contained in the innermost loop are copied to a parent environment ID 642 and attributes 643. The environment ID 641 of the first environment table is placed into the environment ID 635 of the first composite block element. Nothing is set to the intra-environment variable table 644 of the first environment table.

Another new RPC table element is assigned to the procedure F and initialized. A first RPC table element, which is the new RPC table element 651, is assigned to the RPC table 527. A name different from that of any existing RPC name of the other RPC table elements in the RPC table 527 is generated and assigned to the RPC name 652 of the first RPC table element. At this point, nothing is set to the IN argument table 653 and OUT argument table 654. "Automatic generation" is set to the attributes 655.

A second basic block table element is assigned anew to the procedure F and initialized. The second basic block element is used to hold an instruction sequence for calling the procedure F when the innermost loop is retrieved as the procedure F and set aside as a server-side procedure. A number different from that of any other basic block is assigned to the basic block ID 612 of the second basic block element. At this point, nothing is set to the start instruction ID 613, end instruction ID 614, next basic block 615 or preceding basic block 616. A new environment table 524 is allocated as a second environment table. A number different from that of any other environment table is assigned to the environment ID 641 of the second environment table. Blanks are placed into the parent environment ID 642 and attributes 643. Nothing is set to the intra-environment variable table 644 of the second environment table. The environment ID 641 of the second environment table is placed into the environment ID 635 of the second basic block element. In the second basic block element, the DGEN variable table 618, DKILL variable table 619, DIN variable table 620, DOUT variable table 621, LIN variable table 622, LOUT variable table 623, LUSE variable table 624, and LDEF variable table 625 are initialized as described below. In the description that follows, a symbol ∩ stands for a sum of sets, a symbol ∪ denotes a common part of sets, and a symbol − represents a subtraction between sets. There are no priorities, and calculations proceed from left to right. The targets to be operated on are all variable tables. Thus A∪B provides illustratively an operation that puts together all variable table elements included in variable tables A and B to create a new variable table from which the variable table elements whose variable names 622 overlap are removed. Eight variable tables belonging to a given basic block Bi are expressed as Bi.DGEN, Bi.DKILL, Bi.DIN, Bi.DOUT, Bi.LIN, Bi.LOUT, Bi.LUSE, and Bi.LDEF. The basic blocks included in the innermost loop are indicated as B1, B2, etc. The first basic block in the loop is identified by B1. The DGEN variable table 618 of the second basic block is established as B1.DGEN∪B2.DGEN∪ . . . ∪Bn.DGEN. S1, S2, . . . , Sm represent the strings in which the basic blocks B1, B2, . . . , Bn are arranged in the order in which they may be executed in the innermost loop. For example, if Si is made up of Ba, Bb, . . . , Bz and if Fi is constituted by Ba.DKILL∪Bb.KILL ∪ . . . ∪Bz.DKILL, then the DKILL variable table 619 of the second basic block is established as F1∩F2∩ . . . ∩Fm. The DIN variable table 620 of the second basic block is set for B1.DIN, and the DOUT variable table 621 of the second basic block is established as (DIN variable table 620—DKILL variable table 619)∪ DOUT variable table 621. If Gi for Si is constituted by Ba.LDEF∪Bb.LDEF∪ . . . ∪Bz.LDEF, then the LDEF variable table 625 is established as G1∩G1∩ . . . ∩Gm. The LUSE variable table 624 is set for B1.LUSE∪B2.LUSE∪ . . . ∪Bn.LUSE. If C1, C2, . . . , Ck represent basic block groups which are outside the innermost loop and to which control may be passed on from the basic block group within the innermost loop, then the LOUT variable table 623 is provided as C1.LIN∪C2.LIN∪ . . . ∪Ck.LIN. The LIN variable table 622 is set for B1.LIN.

In step 1107, a check is made to see if the basic block in question has already been checked. The check of step 1107 is accomplished by determining if a tag "checked" is included in the attributes 643 of the environment ID 617 in the basic block table 610. If the result of the check in step 1107 is affirmative (1108), step 1125 is reached. If the result in step 1107 is negative (1109), step 1110 is reached.

In step 1110, a check is made to see if the procedure F is likely to make a dangerous reference to a variable. If the result of the check in step 1110 is affirmative (1111), step 1113 is reached. If the result in step 1110 is negative (1112), step 1117 is reached. Typical dangerous references to, or changes of, variables are those performed by use of an alias, i.e., a different name given to the same variable. For example, where there exist variables "p" and "q" of an "int*" type (integer pointer type), *p (pointed to by pointer "p") and *q mostly differ from each other but may sometimes indicate the same integer type data area. When the same data may be referenced or changed by use of a different name, the operation is called a reference or a change by alias.

If an assignment instruction for assignment to a local variable is also integrated along with RPCs, the assignment to the local variable usually performed on the client side is carried out on the server side. At the end of the RPCs, the local variable is written back to the client as an output argument. If assignments to *p and *q above are to be performed on the server side, two integer type data areas need to be provided as output variables on the server side. With these data areas pointed to by "p" and "q," the server code is executed. Thereafter, the contents of the two integer type data areas are sent back to the client for assignment to *p and *q on the client side.

For that reason, if *p and *q are an alias of each other, the sequence of write-back operations to *p and *q becomes unpredictable and can result in a faulty calculation. If a reference and an assignment are made respectively to *p and *q on the server side, the result of the calculations can vary depending on whether "p" and "q" indicate the same data. Unless and until such dangerous references to or changes of variables are eliminated or inhibited, integration of the RPCs in question must be halted.

A dangerous variable reference or change, the judgment of which is contingent on the programming language used by the client source code, is usually determined by use of the variable type in the manner described below. A variable set (called "Fin") coming in from outside the procedure F is held in the DIN variable table 620 of the second basic block. A variable set (called "Frefer") to be referenced or changed in the procedure F is retained in the LUSE variable table 624 of the second basic block. A variable set (called "Fassign") to be changed by the procedure F is stored in the LUSE variable table 624 of the second basic block. A check is made on each of the variables in "Fassign" to see if the type of the variable in question can become an alias of another variable. A variable of a given type can be an alias of another variable only if the variable is of a type that permits indirect reference or change. Illustratively for the language C++, three types apply: a pointer type reference/change, a reference type, and an array element. In the case of Java, an object type of the same class or an object type of two classes having an inheritable set membership applies. With Java, its types are rigid enough to ensure confidence in type identify and inheritance relationship. On the other hand, such programming languages as C++ permit programmers to modify types forcibly. In the latter case, type identity and inheritance relationship are generally not usable for the check above because any of the pointer type, reference type or array reference can become an alias of another variable. The check proceeds as follows: each of the variables included in Fassign∪Frefer is checked. Whether a given variable can become an alias is determined in view of the conditions discussed above, until a group of variables likely to become aliases is obtained. A danger is recognized if the group of variables that could become aliases is not empty.

In step 1113, a check is made to see if it is possible to avoid a dangerous variable reference or change of the procedure F. If the result of the check in step 1113 is affirmative (1115), step 1116 is reached. If the result in step 1113 is negative (1114), step 1125 is reached. Whether or not the dangerous variable reference or change is avoidable depends on whether the number of variables likely to become aliases is below a predetermined count. Illustratively, if a pointer type variable "v" of C++ is not included in "Fassign" and if there is no possibility of a change by alias, then the variable "v" is guaranteed to designate a single data area during the procedure F. In the case of Java, if an object type variable "o" is not included in "Fassign," then the variable "o" is guaranteed to designate a single data area during the procedure F. That is, if all grouped variables likely to become aliases are each guaranteed to designate one data area during the procedure F and if the number of grouped variables likely to become aliases is below a predetermined count, then dangerous references and changes are judged to be avoidable.

Step 1116 adds a code designed to avoid dangerous variable references or changes of the procedure F. Specifically, a basic instruction sequence is inserted in front of the start instruction ID 613 in the basic block designated by the start basic block ID 633 of the first composite block table element in the instruction table 521. The inserted instruction sequence specifies the following operations: "execute the procedure F (on the server side) if two variables v1 and v2 likely to be an alias of each other are different among the grouped variables that could become aliases; if v1 and v2 are the same, execute a conventional basic instruction sequence (on the client side)."

In step 1117, an environment for the procedure F is established. Specifically, the variable table held in the LUSE variable table 624 of the second basic block element is assigned to the intra-environment table 644 of the second environment table above.

In step 1118, input arguments for the procedure F are established. Specifically, the LUSE variable table 624 of the second basic block element is assigned to the IN argument table 653 of the first RPC table element.

In step 1119, output arguments for the procedure F are established. Specifically, a computation "DGEN variable table 618∩LUSE variable table 624" in the second basic block element is carried out, and the result of the computation is assigned to the OUT argument table 654 of the first RPC table element.

In step 1120, the communication cost of the procedure F is calculated. Sizes of the variable groups contained in the IN argument table 653 and OUT argument table 654 computed in steps 1118 and 1119 are obtained from the types 663. It should be noted that the sizes may be unpredicted until run time depending on the type. The sizes of the types are the smallest sizes conceivable. These sizes are summed up to acquire a total transfer data quantity needed at the start and at the end of the procedure F.

In step 1121, a check is made to see if the total transfer data quantity is higher than a constant. If the result of the check in step 1121 is affirmative (1122), step 1125 is reached. If the result in step 1121 is negative (1123), step 1124 is reached.

In step 1124, the procedure F is adopted and stored into the data structure. Specifically, the basic instruction sequence between the start instruction ID 613 and the end instruction ID 614 in each of the basic blocks ranging from the start basic block ID 633 to the end basic block ID 634 in the first composite block table element is moved to the server-side instruction table 525. That part of the parse result 520 which corresponds to the basic instruction sequence in question is moved to the server-side parse result 526. A basic instruction sequence is inserted in front of the start instruction ID 613 of the basic block designated by the start basic block ID 633 of the first composite block table element in the instruction table 521. That inserted basic instruction sequence specifies the following operations: "put input arguments of the procedure F into a stack, call the procedure F, and pull output arguments of the procedure F from the stack." The start and the end of this basic instruction sequence are designated respectively by the start instruction ID 613 and end instruction ID 614 of the second basic block element. The preceding basic block 616 of the basic block designated by the start instruction ID 613 of the first composite block table element is set to the next basic block 615 of the second basic block element.

The next basic block 615 of the basic block designated by the end basic block ID 634 of the first composite block table element is set to the next basic block 615 of the second basic block element. A tag "checked" is added to the attributes 643 of the environment ID 617 of the first basic block.

In step 1125, the procedure F is discarded and a temporarily constructed data structure group is released. Specifically, the first composite table element, first environment table, second basic block table element, and second environment table are released. A tag "checked" is then added to the attributes 643 of the environment ID 617 of the first basic block.

In step 1126, a check is made to see if all possibilities have been examined. That is, a check is made to see if a tag "checked" is included in the attributes 643 of the environment ID 617 for all basic block table elements in the basic block table 522. If the result of the check in step 1126 is affirmative (1128), this process of optimizing the loop comprising RPCs is terminated. If the result in step 1126 is negative (1127), step 1101 is reached again. These are the steps constituting the process for optimizing loops containing RPCs.

The steps making up the second method will now be described with reference to FIG. 12. In step 1201, one RPC is selected. In this step, one basic block in the basic block table 522 is selected so that checks to be described below are performed on each of the instruction table elements 601 in the instruction table 521 ranging from the start instruction ID 613 to the end instruction ID 614 of the basic block in question. A basic instruction whose instruction 604 in the instruction table element is "call procedure" is extracted. A target 603, i.e., the name of the procedure to be called, is treated as the first procedure name. The RPC name 652 of each of the RPC table elements 651 in the RPC table 527 is checked. If the RPC name being checked is found to be the same as the first procedure name, the instruction table element is an RPC. This instruction table element is represented by S. The basic block containing S is called the first basic block. More checks are made on the instruction table elements of the basic block in question. If the next RPC appears in an instruction table element, that instruction table element is adopted as S. Thereafter, step 1202 and subsequent steps are carried out. If the next RPC is not found in the first basic block, the next basic block is examined.

In step 1202, an RPC called T following the instruction table element S is obtained. Specifically, the RPC is detected by checking the instruction table elements 601 one after another in the instruction table 521 ranging from the element S to the end instruction ID 614 of the first basic block. The process of step 1201 ensures the detection of such an RPC. The RPC following the detected instruction table element S referred to as T.

In step 1203, a check is made to see if the basic instruction sequence between S and T is separable. If the result of the check in step 1203 is affirmative (1205), step 1206 is reached. If the result in step 1203 is negative (1204), step 1224 is reached. The basic instruction sequence between S and T is not separable if it contains a function call other than RPCs.

In step 1206, the basic instruction sequence between S and T is separated as a procedure F'. The process of step 1206 is equivalent to that of step 1106 and will not be described further.

In step 1207, a check is made to see if the basic block in question has already been checked. Whether the basic block has been checked is judged by determining whether a tag "S checked" is included in the attributes 643 of the environment ID 617 in the basic block table 610. If the result of the check in step 1207 is affirmative (1208), step 1224 is reached. If the result in step 1207 is negative (1209), step 1210 is reached.

In step 1210, a check is made to see if the procedure F' is likely to effect a dangerous variable reference or change. If the result of the check in step 1210 is affirmative (1211), step 1213 is reached. If the result in step 1210 is negative (1212), then step 1217 is reached in which a process equivalent to that of step 1110 already described is carried out.

In step 1213, a check is made to see if the dangerous variable reference or change of the procedure F' is avoidable. If the result of the check in step 1213 is affirmative (1215), step 1216 is reached. If the result in step 1213 is negative (1214), then step 1224 is reached in which a process equivalent to that of step 1113 described above is carried out.

In step 1216, a code is added to avoid the dangerous variable reference or change of the procedure F'. The process of step 1216 is equivalent to that of step 1116 already described and thus will not be described further.

In step 1217, an environment for the procedure F' is established. The process of step 1217 is equivalent to that of step 1117 described above and will not be described further.

In step 1218, input arguments for the procedure F' are established. The process of step 1218 is equivalent to that of step 1118 already described and thus will not be described further.

In step 1219, output arguments for the procedure F' are established. The process of step 1219 is equivalent to that of step 1119 described above and will not be described further.

In step 1220, the communication cost of the procedure F' is calculated. The process of step 1220 is equivalent to that of step 1120 discussed above and will not be described further.

In step 1221, a check is made to see if a total transfer data quantity calculated in step 1220 is higher than a constant. If the result of the check in step 1221 is affirmative (1222), step 1224 is reached. If the result in step 1221 is negative (1223), step 1225 is reached.

In step 1224, the procedure F' is discarded and a temporarily constructed data structure group is released. The process of step 1224 is equivalent to that of step 1125 already discussed and thus will not be described further. If step 1225 has been passed with respect to the instruction table element S being processed, i.e., if the possibility of further integration is being examined, then the procedure F' is not discarded. The procedure F' is then adopted after the same process as that of step 1225, to be described below, is carried out. The tag to be added to the first basic block is "S checked."

In step 1225, with the next RPC (called U) of the procedure F' obtained, a check is made to see if the procedure F' and U may be integrated further. If the result of the check in step 1225 is affirmative (1226), then S is replaced by T and step 1202 is reached. In that case, a new procedure F' is generated from an instruction sequence containing S, T and U in the subsequent step 1206. If the result in step 1225 is negative (1227), step 1228 is reached.

In step 1228, the procedure F' is adopted and stored into the data structure The process of step 1228 is equivalent to that of step 1124 described above and will not be described further. It should be noted that a tag "S checked" is added to the first basic block.

In step 1229, a check is made to see if all possibilities have been examined. If the result of the check in step 1229 is affirmative (1231), this process of optimizing the instruction sequence wherein RPCs frequently occur is terminated. If the result in step 1229 is negative (1230), step 1201 is reached again. That is, the result of the check is affirmative if all RPCs each called V in the instruction table 521 are found to have a tag "V checked" for any one basic block. If the result of the check is affirmative (1128), the process of optimizing the loop comprising RPCs is terminated. If the result of the check is negative (1127), step 1101 is reached again. These are the steps constituting the process for optimizing instruction sequences wherein RPCs frequently occur.

Processes on the Server Side

The dynamic linker 116 links the additional server object 115 and server object 104 to obtain the effects of RPC optimization in a number of ways. That linkage is achieved by suitably apportioning client requests between the additional server object 115 and the server object 104, or by supplying the server object 104 with part of the requests sent to the additional server object 115. Described below are three methods for linking the server object 104 with the additional server object 115. Attention should be paid to the fact that the server object 104 is marketed as a package which has been compiled and whose source code may be difficult to obtain.

Figure 13:
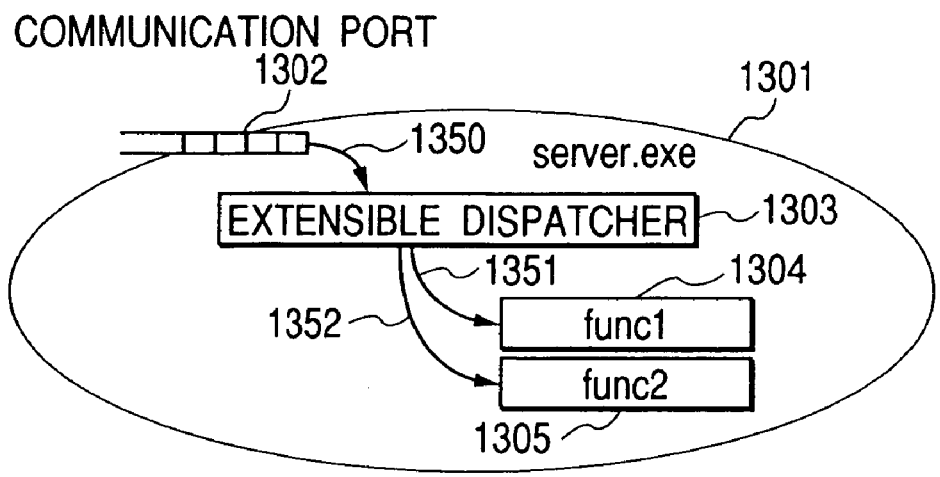
FIG. 13 is a block diagram of an extensible dispatcher.

The first method for linking the server object 104 with the additional server object 115 involves the use of an extensible dispatcher, as described below with reference to FIGS. 13 and 14. The dispatcher is a module incorporated as part of the server and constituted by a series of codes for analyzing requests from clients and for calling up appropriate remote procedures correspondingly. One typical dispatcher is the server stub shown in FIG. 9. The server stub of FIG. 9 has only two kinds of remote procedures: func1 and func2. Alternatively, it is possible to implement "if" statement-based branches between lines 908 and 920 not as the hard-coded branches shown in FIG. 9 but as a table-driven branch sequence. The table has three sets of elements: client-designated remote procedure keys (character strings "func1" and "func2" in the example of FIG. 9), procedures for operating arguments of remote procedures, and bodies of remote procedures. These table elements are checked one by one with regard to a client request. When a key is matched with respect to any table element, the corresponding argument-operating procedure and remote procedure body are started.

The dispatcher is made extensible by implementing the table in a manner allowing it to be supplemented with elements. FIGS. 13 and 14 schematically show typical differences between two setups: one in effect before the dispatcher is extended, and the other brought about after the extension.

A server object 1301 is an object in effect before optimization. An extensible dispatcher 1303 is preinstalled in the server object 1301. Remote procedure calls from clients are placed into a communication port 1302. These calls are read out of the communication port 1302 and analyzed successively (1350) by the extensible dispatcher 1303. The remote procedures "func1" 1304 and "func2" 1305 are stored in the dispatcher. If clients request these two remote procedures, the extensible dispatcher 1303 processes the requests (1351, 1352). Any call other than those for the two remote procedures results in error.

Figure 14:
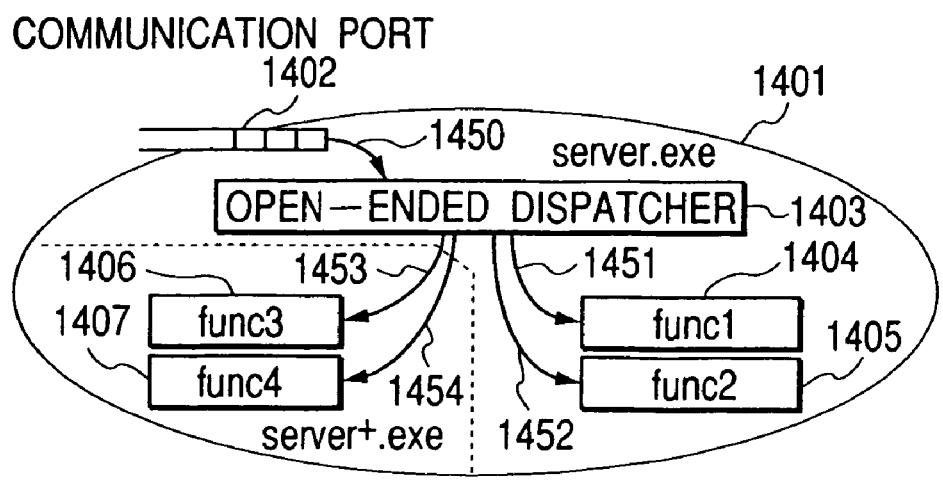
FIG. 14 is a block diagram of an extensible dispatcher after expansion.

When the optimization by the RPC optimizer 101 causes an additional server object (server+.exe) to be incorporated into the server object (server.exe), the setup of FIG. 14 is implemented. An extensible dispatcher 1403 of a server object 1401 retrieves clients' remote procedure requests from a communication port 1402 and analyzes the requests (1450). Four remote procedures ("func1" 1404, "func2" 1405, "func2" 1406, "func2" 1407) are stored into the extensible dispatcher 1403 that has been extended. The storing of the remote procedures is accomplished by entering elements into the above-described table, the entry being carried out by the dynamic linker 116 simultaneously with dynamic linkage of "func2" 1406 and "func2" 1407 with the server object 1401. This makes it possible to call up "func1" 1404, "func2" 1405, "func2" 1406 and "func2" 1407 (1451, 1452, 1453, 1454) in response to the four remote procedure calls from clients.

Figure 15:
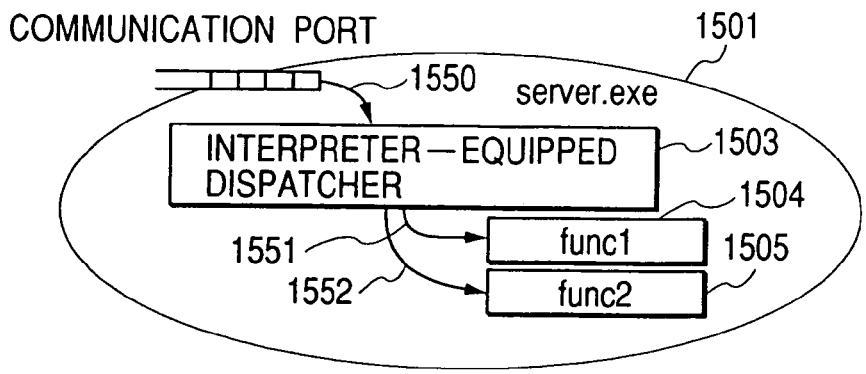
FIG. 15 is a block diagram of an interpreter-equipped dispatcher.

The second method for linking the server object 104 with the additional server object 115 involves installing an interpreter type language in the dispatcher, as shown in FIG. 15. The dynamic linker 116 is capable of placing the additional server object 115 into the same address space as that of a server object 1501. This gives rise to the problem of how to transfer requests coming into the dispatcher to the additional server object 115. In the example of FIG. 15, an interpreter is preinstalled in the dispatcher. When the additional server object 1159 is to be linked to the server object 104, the program to be executed by the interpreter is supplemented with a control instruction specifying that requests for "func3" and "func4" be handed over to the additional server object 115. The adding work is carried out with no problem since it involves modifying the program interpreted and executed by the interpreter in question. If necessary, the program to be modified can be transmitted over a network to the server object 1501. If the requests received through the communication port 1502 are for "func3" and "func4" (1550), then the interpreter executes the above instruction specifying that requests for "func3" and "func4" be handed over to the additional server object 115. In the meantime, a request for "func1" or "func2" is transferred in a conventional manner to "func1" 1504 or "func2" 1505 for processing (1551, 1552).

Figure 16:
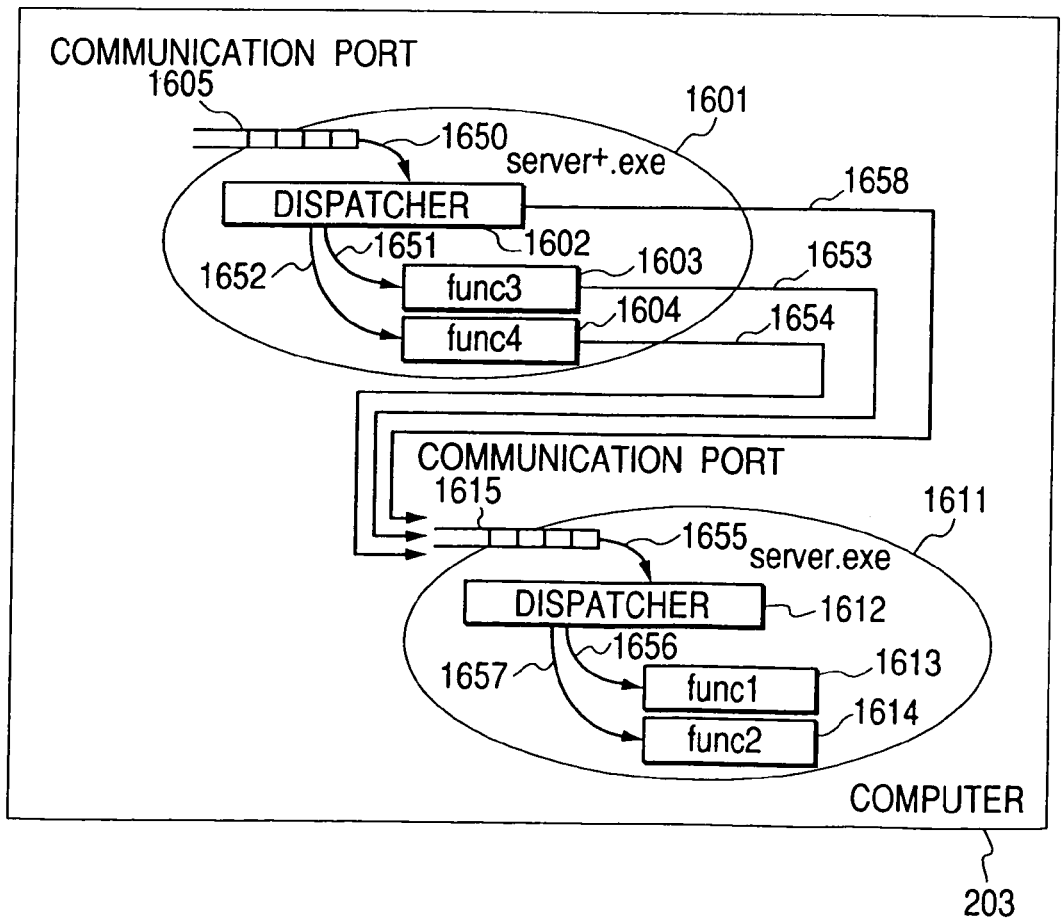
FIG. 16 is a block diagram of a hierarchical server.

The third method for linking the server object 104 with the additional server object 115 involves initially supplying the additional server object 115 with all requests and then transferring requests as needed from there to the server object 104, as depicted in FIG. 16. In this case, there is no need for dynamic link to the server object 104.

Requests from clients are placed into a communication port 1605 of an additional server object 1601 and analyzed (1650) by a dispatcher 1602. If the requested RPC is "func3" 1603 or "func4" 1604 offered by the additional server object 1601, then the appropriate remote procedure is started (1651, 1652). Because "func3" 1603 and "func4" 1604 are remote procedures obtained through integration of RPCs from clients, the requests necessarily include calls for "func1" 1613 and "func2" 1614. These calls are sent to a communication port 1615 of a server object 1611 (1653, 1654). The requests placed into the communication port 1615 are analyzed conventionally by a dispatcher 1612 (1655), and calls for "func1" 1613 or "func2" 1614 are started (1656, 1657). If requests for "func1" 1613 and "func2" 114 have arrived at the communication port 1605, the dispatcher 1602 transfers the requests (1658) to the communication port 1615. With this method in use, there is no need whatsoever to modify the server object 1611. Because RPCs from the additional server object 1601 to the server object 1611 (1653, 1654, 1658) are performed by a single computer, the computing cost involved is appreciably low compared with that of RPCs between computers. For that reason, the benefits of RPC optimization remain significantly high.

Static and Dynamic Optimization

Figure 17:
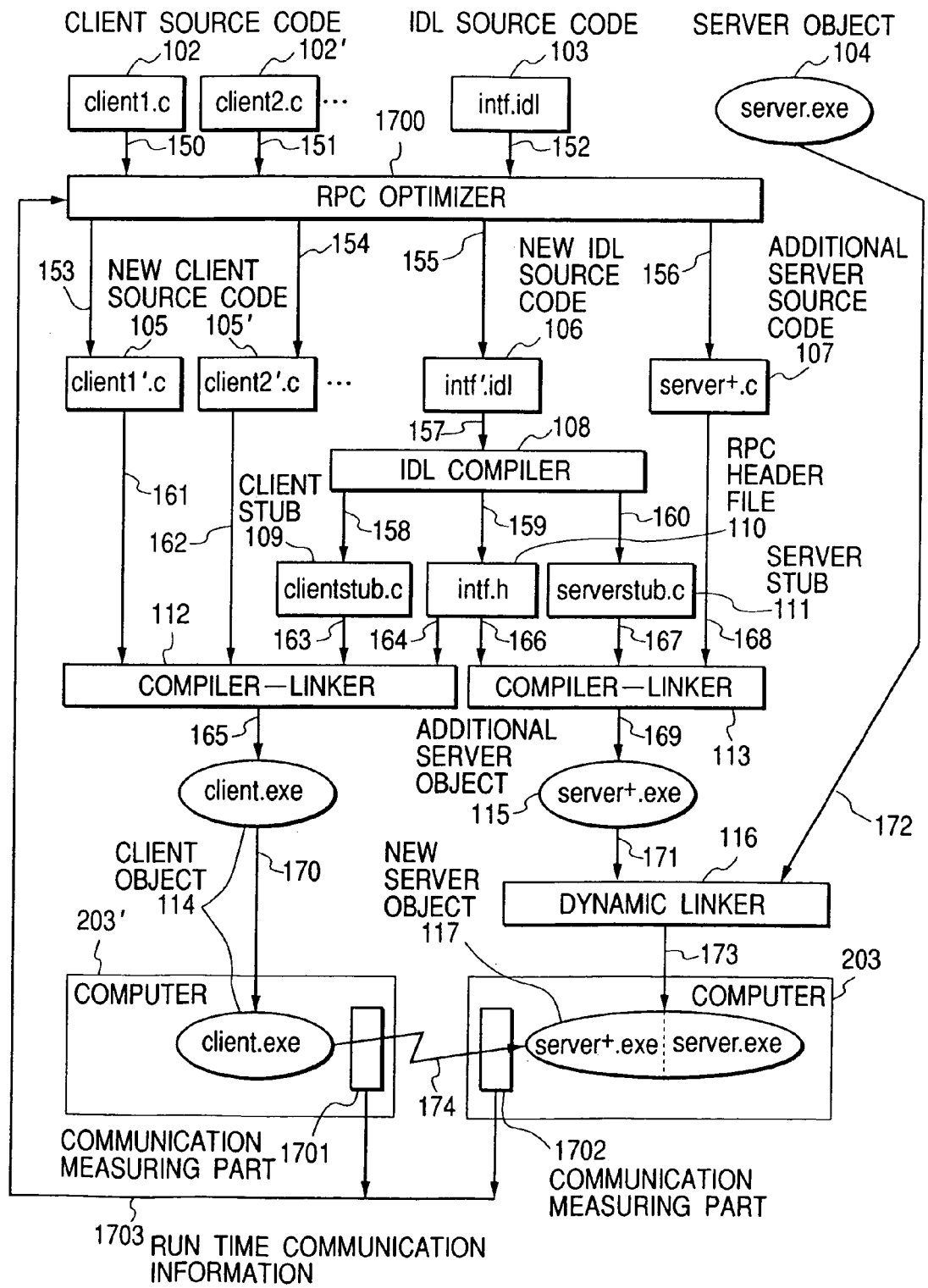
FIG. 17 is a block diagram of an RPC optimizer including a communication measuring part.

Additional functions of the RPC optimizer 101 will now be described with reference to FIG. 17. The computers 203' and 203 are equipped with communication measuring parts 1701 and 1702 respectively. These communication measuring parts measure and record frequencies of RPCs from the ongoing client object 114 to a new server object 117, as well as sizes of input and output arguments. Run time communication information 1703, i.e., a body of measurements thus taken and recorded, is sent at the next compilation time to an RPC optimizer 1700 which is a variation of the RPC optimizer 101 (FIG. 1). The next compilation may be performed manually by developers of the client object 114, periodically by the system administrator, or dynamically during operation of the client object 114. The run time communication information 1703 is utilized in processes such as steps 1120 and 1220 in which the RPC optimizer 1700 evaluates communication costs. Where the sizes of arguments are unpredictable until run time, e.g., where parts of the arguments involve variable length arrays, variable length character strings or unions, the run time communication information 1703 allows transfer data quantities to be computed more accurately than before in steps 1120 and 1220.

Extended IDL

Described below with reference to FIG. 18 is an extended IDL for describing characteristics of remote procedures in detail to improve RPC optimization. The remote procedure characteristics include the probability of side effects resulting from procedures, the feasibility of parallel execution of procedures, and the interchangeability of procedures in their execution order. Such characteristics, when described, permit widening of the scope of integrating alternatives and boost integration efficiency as a result. For these reasons, the RPC optimizer accepts extended IDLs as its inputs in addition to ordinary IDLs.

"extended intf.idl" 1800 is an example of an RPC interface description using an extended IDL. Lines 1801 through 1807 declare a server object type. Lines 1802, 1803 and 1804 declare interfaces of "func1," "func2" and "func3" respectively. As a first extension, line 1802 is supplemented with a "const" reserved word declaring that "func1" is a remote procedure free of side effects. Line 1805 declares that as a second extension, "func2" and "func3" are interchangeable in their execution order. The absence of side effects means that all other remote procedures offered by the same server object are interchangeable in their execution order. As a third extension, line 1806 declares that "func1," "func2" and "func3" are executable in parallel.

These declarations are stored into the attributes 655 of the RPC table 650. There may be a number of ways in which the declarations are conceivably utilized. One way of using the first declaration (no side effects) and the second declaration (interchangeability of execution order) is for them to be used where an RPC called T following S is obtained. If the RPC T is followed by another RPC (called U) that can change its position with T, the RPC U instead of the RPC T is given to the remaining steps. This makes it possible to attempt to integrate not only S and T but also S and U.

There may also exist several ways in which the third declaration (feasibility of parallel execution) is conceivably utilized. One way to use the third declaration is by generating a code for calling a plurality of remote procedures in parallel instead of generating a code for calling multiple remote procedures sequentially when the source code generator 510 generates the additional server source code 107. For example, because "func1" and "func2" are parallelly executable, the third declaration may be used to output the additional server source code "server+.c" 1030 as another additional server source code 1820.

"server+.c" 1820 is a typical additional server source code supplemented with the feasibility of parallel execution of remote procedures. Line 1821 reads an IDL header file generated from "intf.idl" 1000. Line 1822 reads a header file of a thread library necessary for the execution of remote procedures in parallel. A thread refers to a unit of a plurality of remote procedures executable in parallel. Lines 1823 through 1836 define "func3," and lines 1837 through 1847 define "func4." The definitions of "func1" and "func2" are generated conventionally by programmers for the server. Line 1823 declares that the function "func3" is of an "int" reference type without returned values. Lines 1825, 1826 and 1827 declare respectively a list structure "allThreads" in which to store thread identifiers, a local variable array "t" necessary for threads, and a local variable "vral" for returned values of the threads. Lines 1828 through 1831 execute calls to "func1" for each new thread. Lines 1832 through 1835 add up the returned values of "func1" from each thread and place the sum into "count." "rval" is a pointer to the returned values of "func1." Because a plurality of threads may be carried out in parallel, 100 calls to "func1" in the server source code 1820 are likely to be executed parallelly. The probability of such parallel execution is especially high on parallel computers.

Likewise, line 1837 declares the type of the function "func4." Lines 1839 and 1840 declare respectively a list structure "allThreads" in which to store thread identifiers, and a local variable array "t" necessary for threads. Lines 1841 through 1844 specify that "func2" and "func4" be carried out for two threads. Lines 1845 and 1846 verify that the two threads have ended before terminating "func4." This server source code allows "func2" and "func1" to be executed in parallel.

As described above, the generation of a code for thread execution is made possible by use of a relatively mechanical template. Once those processing portions are known which are to be carried out in parallel, there are many well-known compilers for generating codes for such thread execution. Details of such code generation will not be described here.

First Variation of the Invention

In the example of FIG. 1, the RPC optimizer 101 inputs the client source codes 102, 102', etc., and IDL source code 103, and outputs the new IDL source code 106 and additional server source code 107. Alternatively, a variation of the invention may be devised so as to address other environments without getting the RPC optimizer 101 essentially changed in functionality.

Figure 19:
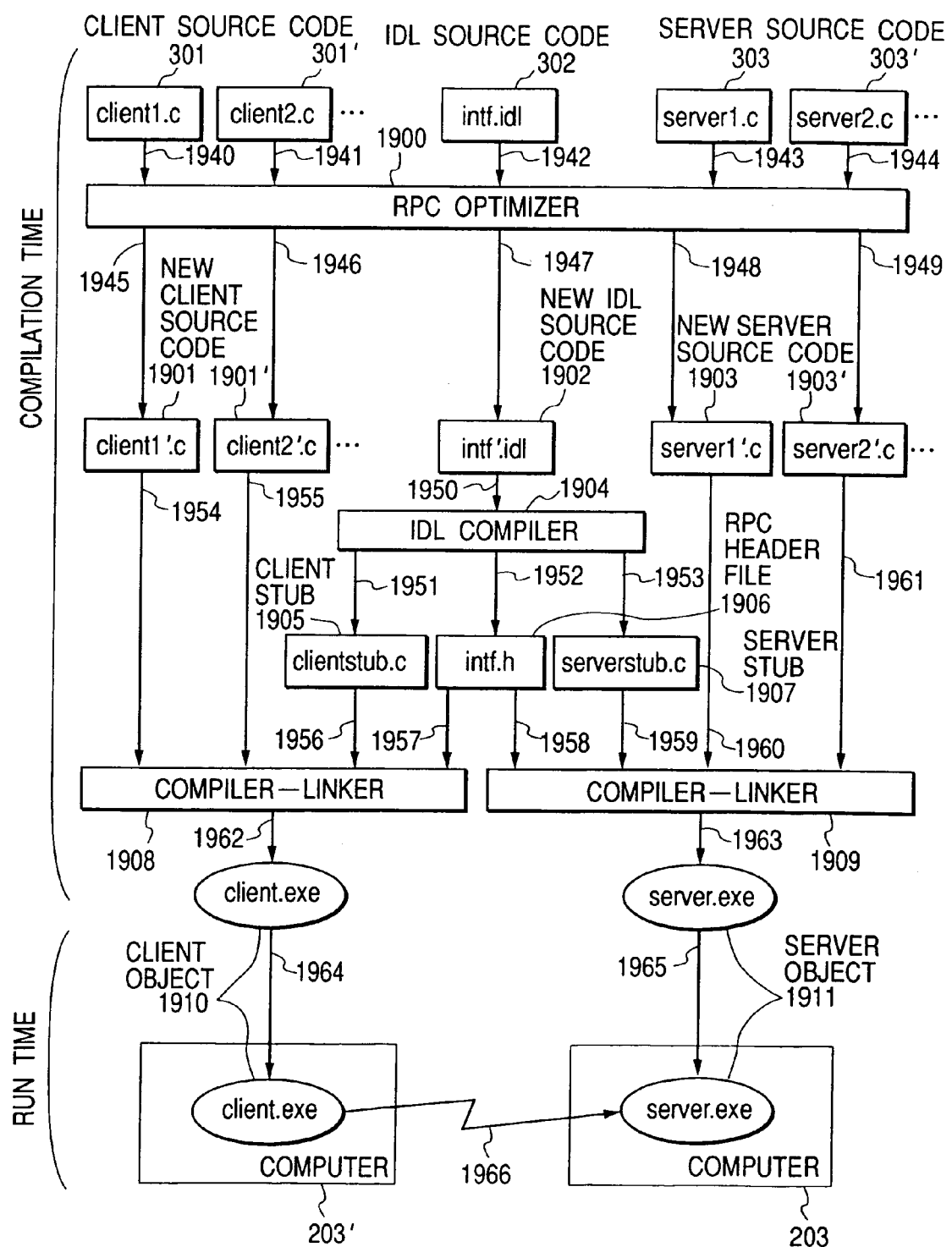
FIG. 19 is a block diagram of a first variation of the invention.

Described below with reference to FIG. 19 is an alternative embodiment (first variation) of the invention suitable for dealing with the conventional environment of FIG. 3 in which to call remote procedures. FIG. 19 is a block diagram showing flows of uses in the first variation from the compilation time on the client side until the run time on the client and server sides.

An RPC optimizer 1900 in the first variation inputs client source codes 301, 301', etc., used for constituting clients; an IDL source code 302 describing in IDL the interface of a remote procedure group offered by a server; and server source codes 303, 303', etc., used to make up the server (1940 through 1944) for RPC optimization. In turn, the RPC optimizer 1900 outputs new client source codes 1901, 1901', . . . (1945, 1946); a new IDL source code 1902 (1947); and new server source codes 1903, 1903', (1948, 1949).

An IDL compiler 1904 operates on the new IDL source code 1902 given as its input, and outputs a client stub 1905 (1951), an RPC header file 1906 (1952), and a server stub 1907 (1953).

The new client source code 1901, 1901', etc., the client stub 1905, and RPC header file 1906 are compiled and linked (1954, 1955, 1956, 1957) by a compiler-linker 1908 that outputs a client object 1910, i.e., an executable program for a client (1962). The new server source codes 1903, 1903', etc., the server stub 1907, and RPC header file 1906 are compiled and linked (1958, 1959, 1960, 1961) by a compiler-linker 1909 that outputs a server object 1911 (1963). This is what takes place at compilation time.

In the run time example of FIG. 19, the client object 1910 is executed on the computer 203' (1964), while the server object 1911 is carried out on the computer 203 (1965). The RPC that occurs at run time (1966) is to either a remote procedure initially declared in the IDL source code 302 or a remote procedure declared in the new IDL source code 1902, or both.

The first variation differs from the embodiment above in that the additional server source code 107 is output as part of the new server source codes 1903, 1903', etc. However, the RPC optimizer 1900 may be implemented using the same internal structure as that of the RPC optimizer 101 described earlier with reference to FIG. 5. Thus the internal structure of the RPC optimizer 1900 will not be described further.

Second Variation

Figure 20:
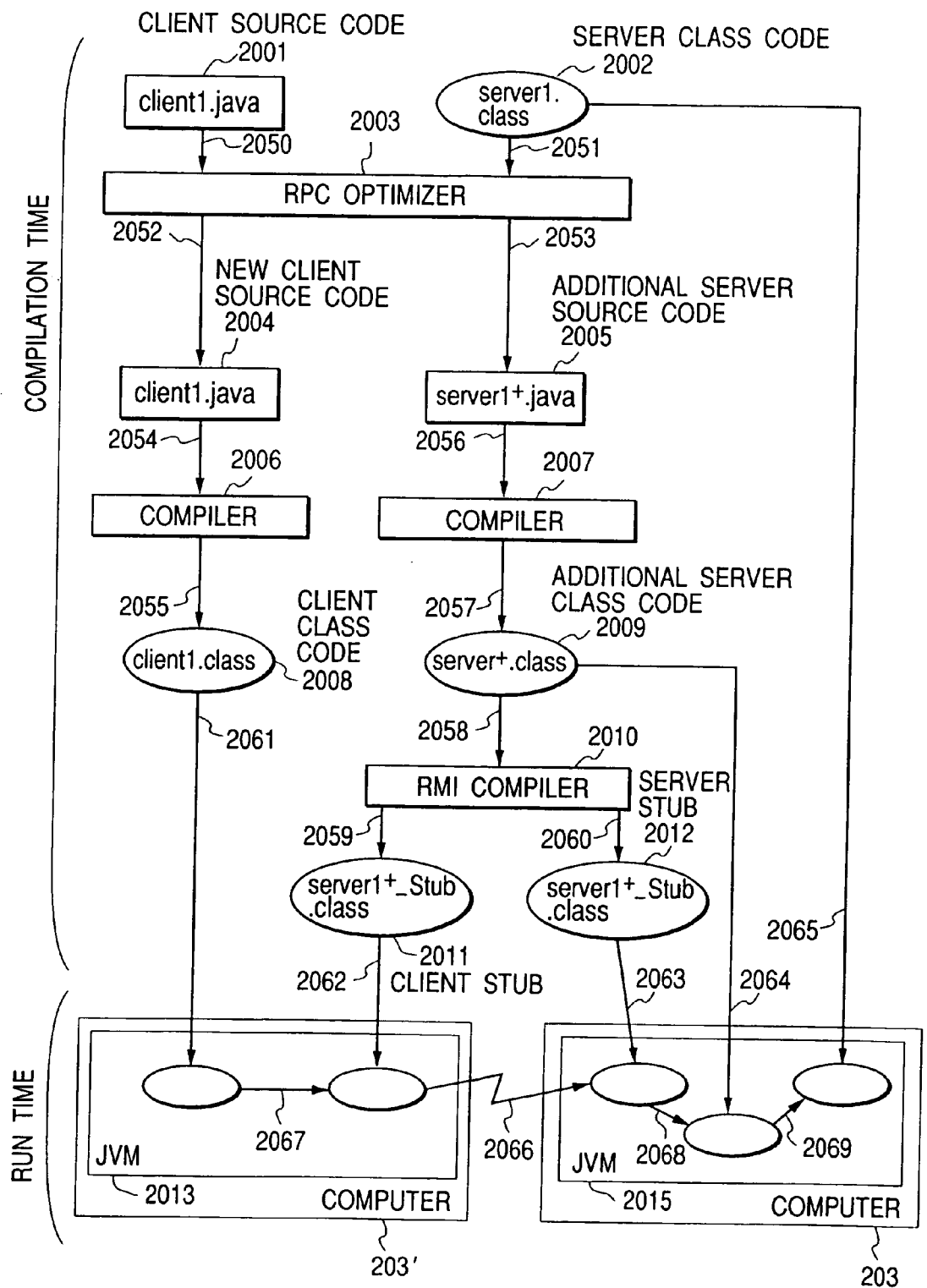
FIG. 20 is a block diagram of a second variation of the invention.

Described below with reference to FIG. 20 is a second variation of the invention suitable for a remote method invocation (RMI), i.e., a remote procedure call in Java. A "class" file which is an intermediate code format of Java for IDL compilers is taken as an input. An output is effected also as a "class" file.

FIG. 20 is a block diagram depicting flows of uses in the second variation from the compilation time on the client side until the run time on the client and server sides.

An RPC optimizer 2003 inputs a client source code 2001 for constituting a client, and a server class code 2002 which is an executable program of a server (2050, 2051) for RPC optimization. In turn, the RPC optimizer 2003 outputs a new client source code 2004 (2052) and an additional server source code 2005 (2053). Although FIG. 20 shows a single source code on each of the client and server sides, this is not limitative of the invention. Alternatively, a plurality of source codes may be used on each side. Because the server class code 2002 includes a definition of an interface for remote procedures, the RPC optimizer 2003 may extract information about the RPC interface declared in IDL in the example of FIG. 1, from the server class code 2002, in the same manner as RMI compilers.

The new client source code 2004 is compiled by a compiler 2006 into an intermediate code format (2054) and output (2055) as a client class code 2008 that is executable by a Java virtual machine (JVM). The additional server source code 2005 is compiled by a compiler 2007 into an intermediate code format (2056) and output (2057) as an additional server class code 2009 that may be executed by the Java virtual machine (JVM). Furthermore, the additional server class code 2009 is compiled (2058) by an RMI compiler 2010 that outputs a client stub 2011 and a client stub 2011 (2059, 2060). This is what takes place at compilation time.

In the run time example of FIG. 20, the client class code 2008 and client stub 2011 are executed (2061, 2062) by a JVM 2013 on the computer 203'. The server class code 2002, additional server class code 2009 and server stub 2012 are carried out (2063, 2064, 2065) by a JVM 2014 on the computer 203. The RPC that occurs at run time (2066) is to either a remote procedure initially declared in the server class code 2002 or a remote procedure declared in the additional server source code 2005, or both. The remote procedure call at this point is transferred in order of 2067, 2066, 2068 and 2069.

The second variation is characterized in that the information about the RPC interface, obtained by the IDL source code 103 in the embodiment of FIG. 1, is extracted from the server class code 2002. The extracting process, however, is any one of well-known methods carried out by RMI compilers.

In the second variation, a Java virtual machine resides in the computer on which the server object (server class code 2002) is run. This, combined with the fact that class codes in Java may be transmitted and received over a network, allows the additional server class code 2009 and server stub 2012 generated by the RPC optimizer of the second variation to be transmitted from the computer 203' to the computer 203 regardless of the server class code 2002 being in or before operation. Such transmission is one of the basic features of Java and thus will not be described further. The same effects are also obtained by the embodiment above if an interpreter or a language execution environment is established on the server side.

Third Embodiment

Figure 21:
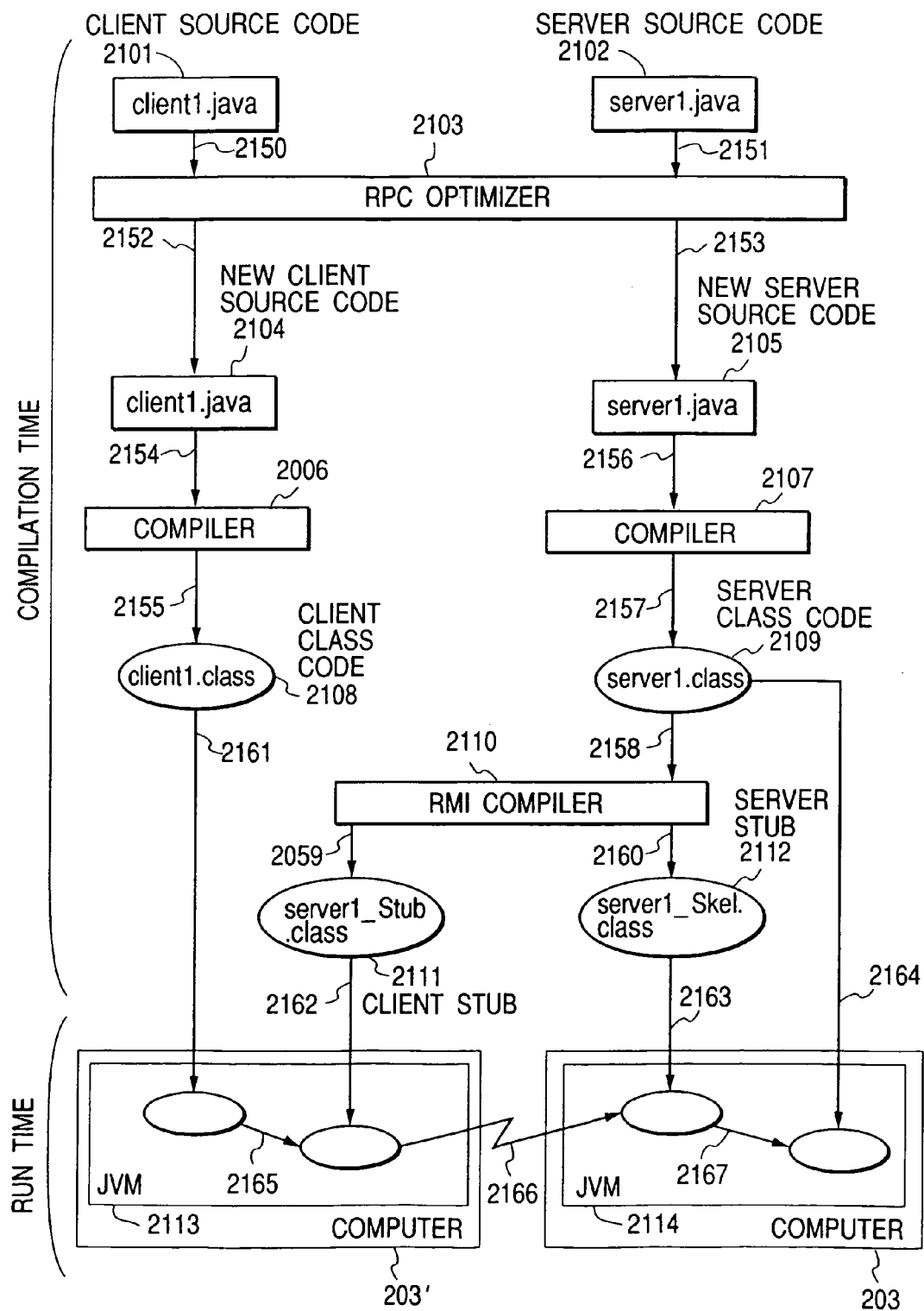
FIG. 21 is a block diagram of a third variation of the invention.

Described below with reference to FIG. 21 is a third variation of the invention suitable for a remote method invocation (RMI) which is a remote procedure call in Java.

FIG. 21 is a block diagram depicting flows of uses in the third variation from the compilation time on the client side until the run time on the client and server sides.

An RPC optimizer 2103 inputs a client source code 2101 for constituting a client and a server source code 2102 for making up a server (2150, 2151) for RPC optimization. In turn, the RPC optimizer 2103 outputs a new client source code 2104 (2152) and a new server source code 2105 (2153). Although FIG. 21 depicts a single source code on each of the client and server sides, this is not limitative of the invention. Alternatively, a plurality of source codes may be used on each side. Because the server source code 2102 includes a definition of an interface for remote procedures, the RPC optimizer 2103 may extract from the server source code 2102 information about the RPC interface declared in IDL in the example of FIG. 1.

The new client source code 2104 is compiled by a compiler 2106 into an intermediate code format (2154) and output (2155) as a client class code 2008 that is executable by a Java virtual machine (JVM). The new server source code 2105 is compiled by a compiler 2107 into an intermediate code format (2156) and output (2157) as a server class code 2109 that may be executed by the Java virtual machine (JVM). Furthermore, the server class code 2109 is compiled (2158) by an RMI compiler 2110 that outputs a client stub 2111 and a client stub 2111 (2159, 2160). This is what takes place at compilation time.

In the run time example of FIG. 21, the client class code 2108 and client stub 2111 are executed (2161, 2162) by a JVM 2113 on the computer 203'. The server class code 2109 and server stub 2112 are carried out (2163, 2164) by a JVM 2114 on the computer 203. The RPC that occurs at run time (2166) is to either a remote procedure initially declared in the server source code 2102 or a remote procedure declared in the new server source code 2105, or both. The remote procedure call at this point is transferred in order of 2165, 2166 and 2167.

The third variation is characterized in that the information about the RPC interface, obtained by the IDL source code 103 in the embodiment of FIG. 1, is extracted from the server source code 2102. The extracting process, however, is any one of well-known methods carried out by RMI compilers and will not be described further.

The invention, as embodied and broadly described above, offers the following major benefits:

(a) RPCs are optimized not by modifying either a server or a client alone but by altering both the server and the client, whereby a plurality of RPCs are integrated into a single RPC. This implements rapid RPC execution between the server and the client.

(b) A client's source code is analyzed in order to detect an execution sequence in which the client consecutively issues a plurality of remote procedures. A new remote procedure for carrying out that execution sequence is added to the server. This allows RPCs frequently occurring on the client side to be extended to the server where a single RPC takes care of the process.

(c) After the client's source code is analyzed to detect an execution sequence in which the client consecutively issues a plurality of remote procedures, the arguments and returned values corresponding to the interface of a new remote procedure for carrying out the execution sequence in a single RPC are determined. These arguments and returned values for the new remote procedure are added to the IDL description. This makes it possible to call from the client a new remote procedure for processing at one stroke RPCs frequently occurring on the client side.

(d) Primarily for the IDL description to be provided separately from the server's source code, the client's source code and IDL description are first input. In turn, the client's modified source code, an altered IDL description, and the server's source code to be added are output. This makes it possible to prepare an object which, when run, processes in one go a plurality of RPCs written by programmers.

(e) Primarily where the IDL description is embedded (conceptually) in the server's object, the client's source code and the server's object are first input. In turn, the client's modified source code and the source code to be added to the server are output. This permits optimization of remote procedure calls when their names and types are described in Java or like language in the server's source codes.

(f) Primarily where the IDL description is embedded (conceptually) in the server's source code, the optimization should be achieved without creating new chores for programmers. For that purpose, the client's source code and the server's object are first input. In turn, the client's modified source code and the source code to be added to the server are output. This provides optimization of remote procedure calls illustratively when their names and types are described in Java (registered trademark of Sun Microsystems Inc.) in the server's source codes.

(g) Upon detection of an execution sequence in which the client consecutively issues a plurality of remote procedures, the inventive method of representing characteristics of the remote procedures in the IDL description helps prepare a new remote procedure for performing that execution sequence.

The beneficial effects above significantly help integrate RPCs into a smaller unit so as to improve performance when a large number of remote procedures are called, whereby programs using remote procedures are made easier to prepare than before.

What is claimed is:

1. A remote procedure call (RPC) optimizing method that optimizes RPCs between a server that offers at least one remote procedure, and a client that carries out processing by use of a RPC calling said at least one remote procedure, said remote procedure call optimizing method being implemented on a computer that executes at least one program or one program part, when an interface definition language (IDL) description for said at least one remote procedure is provided, said remote procedure call optimizing method comprising steps of:

inputting a source code of said client and said IDL description;

detecting from said client source code a processing part that is separable from a remaining instruction sequence of said client source code and that includes a set of RPCs that are highly likely to be executed successively, by detecting an RPC in a repletion loop which does not contain a call function other than the RPC from said client source code;

calculating, by said computer, a first procedure causing said server to perform a process equivalent to said processing part;

replacing said processing part of said client source code with a call to said first procedure, thereby generating a new client source code;

adding an interface of said first procedure to said IDL description, thereby generating a new IDL source code, wherein a new RPC of the call is established in accordance with the new IDL source code and the new client source code; and adding a definition of said first procedure to a source code of said server to allow the new RPC frequently occurring on the client side to be extended to the server to take care of the processing;

wherein said step of calculating said first procedure further comprises the steps of:

estimating transfer data quantities of input and output arguments necessary for said call to said first procedure; and stopping the replacing of said processing part with said call to said first procedure if the estimated transfer data quantities exceed a predetermined level.

2. A remote procedure call (RPC) optimizing method that optimizes RPCs between a server that offers at least one remote procedure, and a client that carries out processing by use of a RPC calling said at least one remote procedure, said remote procedure call optimizing method being implemented on a computer that executes at least one program or one program part, when an interface definition language (IDL) description for said at least one remote procedure is provided, said remote procedure call optimizing method comprising steps of:

inputting a source code of said client and said IDL description;

detecting from said client source code a processing part that is separable from a remaining instruction sequence of said client source code and that includes a set of RPCs that are highly likely to be executed successively, by detecting two RPCs sequentially appearing in said client source code without interposing other call functions;

calculating, by said computer, a first procedure causing said server to perform a process equivalent to said processing part;

replacing said processing part of said client source code with a call to said first procedure, thereby generating a new client source code;

adding an interface of said first procedure to said IDL description, thereby generating a new IDL source code, wherein a new RPC of the call is established in accordance with the new IDL source code and the new client source code; and adding a definition of said first procedure to a source code of said server to allow the new RPC frequently occurring on the client side to be extended to the server to take care of the processing, wherein said step of calculating said first procedure further comprises the steps of:

estimating transfer data quantities of input and output arguments necessary for said call to said first procedure; and stopping the replacing of said processing part with said call to said first procedure if the estimated transfer data quantities exceed a predetermined level.

* * * * *